US012606438B2

(12) United States Patent
Bhardwaj et al.

(10) Patent No.: US 12,606,438 B2
(45) Date of Patent: Apr. 21, 2026

(54) MELT PYROLYSIS OF HYDROCARBON FEEDSTOCK CONTAINING NITROGEN AND/OR HYDROGEN SULPHIDE

(71) Applicant: Nederlandse Organisatie voor toegepast-natuurwetenschappelijk Onderzoek TNO, s-Gravenhage (NL)

(72) Inventors: Rajat Bhardwaj, 's-Gravenhage (NL); Earl Lawrence Vincent Goetheer, 's-Gravenhage (NL); Marco Johannes Gerardus Linders, 's-Gravenhage (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 596 days.

(21) Appl. No.: 18/007,484

(22) PCT Filed: Aug. 5, 2021

(86) PCT No.: PCT/EP2021/071954
§ 371 (c)(1),
(2) Date: Jan. 31, 2023

(87) PCT Pub. No.: WO2022/029272
PCT Pub. Date: Feb. 10, 2022

(65) Prior Publication Data
US 2023/0312347 A1     Oct. 5, 2023

(30) Foreign Application Priority Data
Aug. 5, 2020     (EP) ..................................... 20189648

(51) Int. Cl.
*C01B 32/05*     (2017.01)
*B01J 6/00*     (2006.01)
(Continued)

(52) U.S. Cl.
CPC ............... *C01B 32/05* (2017.08); *B01J 6/008* (2013.01); *C01B 3/26* (2013.01); *C01C 1/0405* (2013.01);
(Continued)

(58) Field of Classification Search
CPC ... C01B 32/05; C01B 3/26; C01B 2203/0277; C01B 2203/043; C01B 2203/0485;
(Continued)

(56) References Cited

U.S. PATENT DOCUMENTS

2020/0071162 A1     3/2020   Gupta et al.

FOREIGN PATENT DOCUMENTS

WO          2019/099795 A1     5/2019
WO     WO 2019/226416     * 11/2019 .............. B01J 19/00
WO     WO-2019226416 A1 * 11/2019 .......... B01J 19/2465

OTHER PUBLICATIONS

Upham, et al., Catalytic molten metals for the direct conversion of methane to hydrogen and separable carbon, Science 2017; 358: 917-921 (Year: 2017).*

(Continued)

*Primary Examiner* — Daniel C. McCracken
(74) *Attorney, Agent, or Firm* — Ipsilon USA—NLO

(57)     ABSTRACT

The present invention relates to a method for molten metal pyrolysis of a feed comprising hydrocarbons and nitrogen and/or hydrogen sulphide to produce solid carbon and one or more of liquid sulfur, hydrogen gas and ammonia gas. The molten salt layer contains two reaction zones of different temperatures, a high temperature zone for pyrolysing the hydrocarbon and a low temperature zone for pyrolysing the hydrogen sulphide and/or forming the ammonia. Liquid salt is used to separate produced solid carbon and optionally the produced liquid sulphur from the molten metal and to facilitate isolation of produced carbon. The invention further (Continued)

relates to a reactor for performing the method according to the invention.

18 Claims, 3 Drawing Sheets

(51) Int. Cl.
    *C01B 3/26*            (2006.01)
    *C01C 1/04*            (2006.01)

(52) U.S. Cl.
    CPC ................. *C01B 2203/0277* (2013.01); *C01B 2203/043* (2013.01); *C01B 2203/0485* (2013.01)

(58) Field of Classification Search
    CPC .............. C01B 2203/0405; B01J 6/008; C01C 1/0405; Y02E 60/36; Y02P 20/52
    See application file for complete search history.

(56) References Cited

OTHER PUBLICATIONS

Rahimi, et al., Solid carbon production and recovery from high temperature methand pyrolysis in bubble cols. containing molten metals and molten salts, Carbon 2019; 151: 181-191 (Year: 2019).*

Parkinson, et al., Hydrogen production using methane: Technoeconomics of decarbonizing fuels and chemicals, International Journal of Hydrogen Energy 2018; 43: 2540-2555 (Year: 2018).*

Leal Pérez Brandon, José et al: "Methane pyrolysis in a molten gallium bubble col. reactor for sustainable hydrogen production: Proof of concept & techno-economic assessment", International Journal of Hydrogen Energy, Elsevier, Amsterdam, NL, vol. 46, No. 7, Dec. 3, 2020, pp. 4917-4935, XP086448172.

Nazanin, Rahimi et al: "Solid carbon production and recovery from high temperature methane pyrolysis in bubble columns containing molten metals and molten salts", Carbon, vol. 151, May 17, 2019, pp. 181-191, XP055609075.

* cited by examiner

MELT PYROLYSIS OF HYDROCARBON FEEDSTOCK CONTAINING NITROGEN AND/OR HYDROGEN SULPHIDE

FIELD OF THE INVENTION

The present invention relates to a method for molten metal pyrolysis of hydrocarbons to produce hydrogen gas and carbon. Liquid salt is used to separate produced carbon from the molten metal and to facilitate isolation of produced carbon.

BACKGROUND ART

The invention relates to improved methods for molten metal pyrolysis of hydrocarbons, to produce hydrogen gas and solid carbon. Traditional method for producing $H_2$ from for example $CH_4$ (methane) results in massive $CO_2$ emissions. Molten metal pyrolysis has emerged recently as a new method to produce $H_2$ and solid carbon, which can reduce the overall $CO_2$ emissions for $H_2$ and carbon combined by >90%. Use of pyrolysis technology as a method for $H_2$ production has a twofold advantage. There are negligible process-based $CO_2$ emissions; and the carbon produced (as solid product) is without any additional $CO_2$ emission, which therefore is significantly lower than conventional spray drying method for production of carbon ($CO_2$ footprint 2.5-4 ton $CO_2$ per ton of produced carbon). Hydrogen and carbon are valuable products. Currently, the latter is a market at megaton scale. Generally, 1 ton (~200 euros) of methane pyrolysis generates a value of 1000 euros in carbon (conservative assumption) and 375 euros in hydrogen gas when 100% conversion is assumed (literature values of 95% are reached by Upham et al., 2017 Science, 358(6365), 917-921). Overall, a margin of over a factor five can be achieved. Thus, pyrolysis of methane has an enormous economic potential and at the same time leads to a significant $CO_2$ reduction, and $CO_2$ credits earned from this process may further benefit the overall margins.

Molten metal pyrolysis is known in the art. Examples of processes are given in U.S. Pat. No. 5,298,233A, Upham et al.; Wang et al., 2008, J. Mol. Cat. A, 283(1-2), 153-157; Plevan et al., 2015, Int. J. Hydrogen Energy, 40(25), 8020-8033; Ahmed et al., 2009, Applied Catalysis A, 359(1-2), 1-24; Parra & Agar, 2017, Int. J. Hydrogen Energy, 42(19), 13641-13648.

For example, Upham et al. describe catalytic molten metals for the direct conversion of methane to hydrogen and separable carbon. In general, hydrocarbons such as methane gas are fed through a layer of molten metal catalyst which cracks the methane into solid carbon and hydrogen gas. Both these species have a lower density than the molten metal, causing the products to diffuse towards the top of the liquid metal layer. The hydrogen gas evolves and can be captured, while the carbon is a solid and will accumulate floating on top of the molten metal.

A problem with known hydrogen gas formation from hydrocarbons is this accumulation of carbon. As discussed by Plevan et al., existing reactors have a high risk of an irreversible reactor blockage due to solid carbon formation. Solid carbon formation is also reported to weaken the active surface of non-carbonaceous catalysts in the reaction zone.

A problem with conventional molten metal pyrolysis processes is that isolation of the solid carbon product involves separation from molten metal. Solid carbon can complex with metal, inactivating its catalytic properties. Upham et al. suggest two methods to improve carbon isolation. The first method is to mechanically skim the carbon from the molten metal surface, a technique known from metallurgical processes, where it is used to remove slag material from melts. The second suggested method involves the use of a gas flow to blow the produced carbon away from the molten metal.

These known suggestions only relate to removal of solid carbon from the molten metal reactor and not to its separation from metal. The methods do not solve the problems caused by carbon-metal interaction. Additionally, skimming would either involve simultaneous removal of molten metal to allow all carbon to be skimmed, or it would involve incomplete carbon skimming as to not disturb the molten metal. This would either lead to gradual catalyst depletion, or to persisting carbon-metal interaction. Similarly, blowing does not address carbon-metal interaction.

U.S. Pat. No. 5,298,233 describes the use of a vitreous layer to cover a molten metal catalyst. The layer can consist of for example halogens, sulphur, phosphorus, or heavy metals. It has a poor permeability, and thus increases residence time of the carbon and the hydrogen in the molten metal catalyst. This increased residence time is to promote oxidation of carbon to a carbon oxide gas such as carbon dioxide, which can then be separated from the molten metal. Oxidation of the carbon requires a distinct molten metal catalyst in addition to the molten metal used for pyrolysis. The additional catalyst forms a second layer of molten metal, forming a multi-layered molten metal system. No solid carbon product is obtained by such methods.

WO 2019/226416 describes a process wherein a hydrocarbon is fed into a reactor containing molten salt and a reactive component, to form solid carbon and hydrogen gas and the solid carbon is separated from the molten salt.

There is a need for improved pyrolysis methods, preferably involving only a single layer of catalyst, preferably having reduced carbon dioxide gas emission, preferably resulting in less waste emission. There is a need for improving the output of valuable products from pyrolysis processes, or to improve the quality of such products. There is a need for improved methods of separating solid carbon from molten metal, preferably at high temperatures and/or in a continuous process.

SUMMARY OF THE INVENTION

The invention relates to the molten metal pyrolysis of hydrocarbons, assisted by a molten salt layer to facilitate isolation of the non-gaseous products of the pyrolysis. The invention specifically relates to three steps: (1) the use of the catalytic effect of molten metal at high temperatures to achieve conversion of the hydrocarbon feedstock and other gases to useful products via pyrolysis and possibly further processes such as Haber Bosch; (2) use of molten salts to effectively separate the solid and liquid products using density differences; and (3) use of the variation in temperature within the molten metal to form different reaction zones within the reactor and form valuable further products in addition to the hydrocarbon pyrolysis product. The process according to the invention is able to utilize other gases present in the hydrocarbon feedstock and convert this to further useful products. For example, the presence of nitrogen leads to the formation of ammonia gas as well as solid carbon. Further, the present of hydrogen sulphide leads to the formation of liquid sulphur as well as solid carbon.

The invention utilizes two reaction zones with different temperatures within in the pyrolysis reactor, which allows for the pyrolysis of hydrocarbons at high temperatures in the first zone and the formation of ammonia gas and/or liquid sulphur at lower temperatures in the second zone. As such, the pyrolysis of the invention is not only able to cope with the presence of other gases (e.g. impurities) in the hydrocarbon feedstock, but even converts them into useful products. Thus, in one embodiment, in the first zone, the hydrocarbons are converted into solid carbon and hydrogen gas, while nitrogen gas passes the first zone unreacted and in the second zone reacts at the lower temperature with the produced hydrogen gas to form ammonia gas. The ammonia gas is collected as gaseous product evolving from the reactor while the produced solid carbon is collected from the molten metal by the use of molten salt. In a second embodiment, in the high temperature reaction zone, the hydrocarbon is pyrolysed to solid carbon and hydrogen gas. Hydrogen sulphide is pyrolysed to sulphur and hydrogen gas, which may occur in the high temperature reaction zone or the low temperature reaction zone, whichever occurs upstream in the process. In the second reaction zone at lower temperature, the gaseous sulphur condensates to liquid sulphur and any remaining unconverted hydrogen sulphide is pyrolysed into sulphur and hydrogen gas. Furthermore, some $CS_2$ may be formed at the reaction conditions, possibly by reaction of the produced sulphur and/or unconverted hydrogen sulphide with solid carbon and/or unconverted hydrocarbon. These reaction zones can be rearranged as such that the lower temperature reaction zone is located upstream, where the feedstock enters and hydrogen sulphide is pyrolysed first before pyrolysis of the hydrocarbon at the higher temperature reaction zone located downstream. the molten salt layer is located on top of the molten metal reaction zones and separates any metal impurities from the solid carbon and/or liquid sulphur product. The products accumulate at the top of the salt layers or may be dispersed therein, but are physically separated from the layer of molten metal by the liquid salt layer. As such, the products are drawn off for separation from any salt impurities, while separation from metal impurities is not needed.

The molten salt is immiscible with the molten metal. It has a lower density, and can therefore form a layer on top of the molten metal. The solid carbon product has an ever lower density and can thus accumulate on top of the molten salt, or it can form a mixture with the molten salt. The carbon product is thus physically separated from the molten metal. Solid carbon, together with some molten salt, is collected from the top of the molten mass in the reactor. Separation of the carbon product from molten salt is readily achieved, e.g. by simple washing with water, which rapidly removes salt from the carbon product. In addition, the liquid sulphur may be collected as a separate liquid layer, which is typically positioned on top of the molten salt layer in the low temperature reaction zone. Alternatively, the liquid sulphur is dispersed in the layer of molten salt and is collected as a mixture of liquid sulphur and molten salt, optionally together with solid carbon, and wherein the method may further comprise separating the liquid sulphur from the solid carbon and the molten salt.

LIST OF PREFERRED EMBODIMENTS

In a first preferred embodiment, the invention concerns the formation of solid carbon and ammonia from a feed comprising hydrocarbon and nitrogen gas. The invention according to this embodiment is preferably defined as follows:

1. Method for producing solid carbon and ammonia gas by molten metal pyrolysis of hydrocarbons, the method comprising:
   (i) feeding a stream comprising hydrocarbon and nitrogen into a pyrolysis reactor comprising a catalytic layer of molten metal, wherein the reactor comprises two reaction zones, a first zone for pyrolysing the hydrocarbon into solid carbon and hydrogen gas, and a second zone for reacting the hydrogen with the nitrogen to form ammonia, and wherein the second zone is kept at a lower temperature than the first zone;
   (ii) feeding a stream of molten salt into the pyrolysis reactor to separate the solid carbon from the molten metal.
   (iii) collecting a product gas containing ammonia gas that evolves from the reactor;
   (iv) collecting a mixture comprising solid carbon and molten salt;
   (vi) separating the mixture obtained in step (iv) to obtain a product comprising solid carbon and separated salt.
2. The method according to embodiment 1, wherein the metal in the molten metal is selected from the group consisting of Mg, Pd, In, Bi, Sn, Ga, Pb, Ag, Cu, Sn, Pt, Ni, Fe, Co, Au, Mo, Cr, W and V, preferably wherein the metal in the first zone is selected from Mg, Pd, In, Bi, Sn, Ga, Pb, Ag, Cu, Sn, Pt, Ni, Fe, Co and Au and/or in the second zone is selected from In, Co, Fe, Ni, Mo, Cu, Cr, W and V.
3. The method according to embodiment 1 or 2, wherein the salt has a heat capacity of at most 2 J/K, more preferably at most 1.7 J/K, most preferably at most 1.6 J/K, and/or wherein the salt comprises at least one of $KNO_3$, $NaNO_3$, NaCl, KCl, LiCl, $MgCl_2$, CuCl, $NiCl_2$, $ZnCl_2$, $ZnBr_2$ and NaBr.
4. The method according to any one of embodiments 1-3, wherein the hydrocarbon comprises a $C_1$-$C_4$ hydrocarbon, preferably methane.
5. The method according to any one of embodiments 1-4, further comprising:
   (vii) separating the product gas obtained in step (iii) into unconverted hydrocarbon gas, unconverted nitrogen gas, hydrogen gas and ammonia gas, preferably using an adsorbent material, to obtain purified hydrogen gas, purified ammonia gas, recovered hydrocarbon and recovered nitrogen gas.
6. The method according to embodiment 5, wherein the recovered hydrocarbon is recycled back into the pyrolysis reactor as part of step (i).
7. The method according to any one of embodiments 1-6, wherein the reactor has an inlet for receiving the feed stream at or near the bottom end of the reactor, an outlet for discharging a mixture of carbon and molten salts in a side wall, and an outlet for discharging a product gas comprising ammonia at or near the top end.
8. The method according to any one of embodiments 1-7, wherein a layer of molten salt is present in the pyrolysis reactor, and wherein step (v) involves skimming to collect the solid carbon and part the layer of molten salt, such that substantially all of the solid carbon is removed from the reactor.
9. The method according to any one of embodiments 1-8, wherein step (vi) involves separating solid carbon from the separated salt by filtering and/or washing the mixture with an aqueous liquid, preferably using a metal filter or a ceramic filter, to obtain a product comprising pure solid carbon and a separated salt.

10. The method according to any one of embodiments 1-9, wherein the separated salt is recycled into the reactor as part of step (ii).

11. The method according to any one of embodiments 1-10, wherein the temperature in the first zone is kept in the range of 600-1500° C. and the temperature in the second zone is kept in the range of 250-400° C.

12. The method according to any one of embodiments 1-11, wherein the metal for the catalytic layer of molten metal in the first zone differs from the metal used for the catalytic layer in the second zone, preferably wherein the metal of the catalytic layer in the first zone is Ni and/or the metal of the second zone is Fe or Co.

13. The method according to any one of embodiments 1-12, wherein the first zone and second zone are in separate reactors.

14. The method according to embodiment 13, wherein the carbon separation with molten salt is part of the reactor comprising the first zone.

15. The method according to any one of embodiments 1-14, wherein step (i) typically involves bubbling of the hydrocarbon feed though the molten metal, wherein the diameter of the bubbles is in the range of 0.1-1000 μm, preferably in the range of 1-500 μm, most preferably in the range of 10-100 μm.

16. Reactor for performing molten metal pyrolysis of hydrocarbons (1), the reactor comprising:
   (a) a vessel (4) for holding a catalytic layer of molten metal (5,6) and a layer of molten salt (7),
   (b) an inlet (3) for receiving the hydrocarbon and nitrogen (1) at or near the bottom end of the vessel (4), a first outlet (14) for discharging a mixture of solid carbon and molten salts in a side wall of the vessel (4), and a second outlet (9) for discharging a product gas comprising ammonia at the top end of the vessel;
   (c) catalytic layer of molten metal comprising two reaction zones with different temperatures;
   (d) means (15) for separating a mixture of solid carbon and molten salts discharged from the first outlet (14);
   (e) means for heating the reactor to a first temperature in a first zone and to a second temperature in a second zone, wherein the first temperature is higher than the second temperature and the first zone is located upstream of the second zone;
   (f) a recycle (18) for recycling molten salts from the separator (15) to the vessel (4).

17. The reactor according to embodiment 16, wherein the reactor is a bubble column reactor.

18. The reactor according to embodiment 16 or 17, wherein the reactor is heated using the hydrocarbon, the hydrogen gas, or electricity.

In a second preferred embodiment, the invention concerns the formation of solid carbon, liquid sulphur and hydrogen gas from a feed comprising hydrocarbon and hydrogen sulphide. The invention according to this embodiment is preferably defined as follows:

1. Method for producing solid carbon, liquid sulphur and hydrogen gas by molten metal pyrolysis of hydrocarbons, the method comprising:
   (i) feeding a stream comprising hydrocarbon and nitrogen into a pyrolysis reactor comprising a catalytic layer of molten metal, wherein the reactor comprises two reaction zones, a first zone for pyrolysing the hydrocarbon into solid carbon and hydrogen gas, and a second zone for reacting the hydrogen with the nitrogen to form ammonia, and wherein the second zone is kept at a lower temperature than the first zone;
   (ii) feeding a stream of molten salt into the pyrolysis reactor to separate the solid carbon from the molten metal.
   (iii) collecting a product gas containing ammonia gas that evolves from the reactor;
   (iv) collecting a mixture comprising solid carbon and molten salt;
   (vi) separating the mixture obtained in step (iv) to obtain a product comprising solid carbon and separated salt.

2. The method according to embodiment 1, wherein the liquid sulphur is collected as part of the mixture comprising solid carbon and molten salt, and wherein step (vi) further comprises separating the liquid sulphur from the solid carbon and the molten salt.

3. The method according to embodiment 1 or 2, wherein the liquid sulphur is collected in step (v) is a separate liquid layer positioned in between the molten metal and the molten salt.

4. The method according to any one of embodiments 1-3, wherein the temperature of the first zone is in the range of 600-1500° C. and the temperature of the second zone is in the range of 250-400° C.; and/or wherein the composition of the molten metal in the first zone is different from the composition of the molten metal in the second zone.

5. The method according to any one of embodiment 1-4, wherein the metal in the molten metal is selected from the group consisting of Mg, Pd, In, Bi, Sn, Ga, Pb, Ag, Cu, Sn, Pt, Ni, Fe, Co, Au, Mo, Cr, W and V, preferably wherein the metal in the first zone is selected from Mg, Pd, In, Bi, Sn, Ga, Pb, Ag, Cu, Sn, Pt, Ni, Fe, Co and Au and/or in the second zone is selected from In, Co, Fe, Ni, Mo, Cu, Cr, Wand V.

6. The method according to any one of embodiment 1-5, wherein the salt has a heat capacity of at most 2 J/K, more preferably at most 1.7 J/K, most preferably at most 1.6 J/K, and/or wherein the salt comprises at least one of $KNO_3$, $NaNO_3$, NaCl, KCl, LiCl, $MgCl_2$, CuCl, $NiCl_2$, $ZnCl_2$, $ZnBr_2$ and NaBr.

7. The method according to any one of embodiments 1-6, wherein the hydrocarbon comprises a $C_1$-$C_4$ hydrocarbon, preferably methane.

8. The method according to any one of embodiments 1-7, further comprising:
   (vii) separating the product gas obtained in step (iii) into unconverted hydrocarbon gas, unconverted hydrogen sulphide gas and hydrogen gas, preferably using an adsorbent material, to obtain purified hydrogen gas and recovered hydrocarbon.

9. The method according to embodiment 8, wherein the recovered hydrocarbon and hydrogen sulphide are recycled back into the pyrolysis reactor as part of step (i).

10. The method according to any one of embodiments 1-9, wherein the reactor has an inlet for receiving the feed stream at or near the bottom end of the reactor, an outlet for discharging a mixture of carbon and molten salts in a side wall, and an outlet for discharging a product gas comprising hydrogen at or near the top end.

11. The method according to any one of embodiments 1-10, wherein the reactor has a separate outlet for discharging a mixture of liquid sulphur and molten metal in a side wall which is positioned below the outlet for discharging a mixture of carbon and molten salts.

12. The method according to any one of embodiments 1-11, wherein the first zone is located downstream from the second zone, preferably wherein the first and second zones are located within the same reactor.

13. The method according to any one of embodiments 1-12, wherein the second zones are located within a reactor upstream of the reactor containing the first zone.

14. The method according to any one of embodiments 1-13, wherein a layer of molten salt is present in the pyrolysis reactor, and wherein step (iv) involves skimming to collect the solid carbon and part the layer of molten salt, such that substantially all of the solid carbon is removed from the reactor.

15. The method according to any one of embodiments 1-14, wherein step (vi) involves separating solid carbon from the separated salt by filtering and/or washing the mixture with an aqueous liquid, preferably using a metal filter or a ceramic filter, to obtain a product comprising pure solid carbon and a separated salt.

16. The method according to any one of embodiments 1-15, wherein the process further comprises a step wherein the liquid sulphur collected in step (v) is separated from molten metal by cooling the mixture to below the melting point of the metal but above the melting point of the sulphur, and separating the solid metal from the liquid sulphur, preferably by filtration, preferably wherein the mixture is cooled to a temperature in the range of 100-400° C.

17. The method according to any one of embodiments 1-16, wherein the separated salt is recycled into the reactor as part of step (ii).

18. The method according to any one of embodiments 1-17, wherein step (i) typically involves bubbling of the hydrocarbon feed though the molten metal, wherein the diameter of the bubbles is in the range of 0.1-1000 μm, preferably in the range of 1-500 μm, most preferably in the range of 10-100 μm.

19. Reactor for performing molten metal pyrolysis of hydrocarbons and hydrogen sulphide, wherein the reactor comprises:

(a) a vessel (4) for holding a catalytic layer of molten metal (6) and a layer of molten salt (7), (b) an inlet (3) for receiving the hydrocarbon and hydrogen sulphide (1) at or near the bottom end of the vessel (4), a first outlet (14) for discharging a mixture of solid carbon and molten salts in a side wall of the vessel (4), and a second outlet (9) for discharging a product gas comprising hydrogen at the top end of the vessel, and a separate outlet (14a) for discharging a mixture of liquid sulphur and molten metal in a side wall which is positioned below the outlet (14) for discharging a mixture of carbon and molten salts;

(c) catalytic layer of molten metal comprising two reaction zones with different temperatures;

(d) means (15) for separating a mixture of solid carbon and molten salts discharged from the first outlet (14); and (e) means for heating the reactor to a first temperature in a first zone and to a second temperature in a second zone, where the first temperature is higher than the second temperature.

(f) a recycle (18) for recycling molten salts from the separator (15) to the vessel (4).

20. The reactor according to embodiment 19, wherein the reactor is a bubble column reactor.

21. The reactor according to embodiment 19 or 20, wherein the reactor is heated using the hydrocarbon, the hydrogen gas, or electricity.

DETAILED DESCRIPTION OF THE INVENTION

The present invention concerns a method and a reactor. The method according to the invention is preferably performed in the reactor according to the invention, and the reactor according to the invention is preferably designed to perform the process according to the invention. Thus, anything described here below for the reactor also applies to the method, and anything described here below for the method also applies to the reactor.

The invention primarily concerns two embodiments, one wherein the feedstock comprises hydrocarbon and nitrogen and the products contain solid carbon and ammonia, and one wherein the feedstock comprises hydrocarbon and hydrogen sulphide and the products contain solid carbon, hydrogen gas and liquid sulphur. In an especially preferred embodiment, the feedstock comprises hydrocarbon, hydrogen sulphide and nitrogen and the products contain solid carbon, liquid sulphur and ammonia.

Method

In a first aspect, the invention provides a method for producing of solid carbon and one or more of liquid sulphur, hydrogen gas and ammonia gas by molten metal pyrolysis of hydrocarbons, the method comprising:

(i) feeding a stream comprising hydrocarbon and nitrogen and/or hydrogen sulphide into a pyrolysis reactor comprising a catalytic layer of molten metal, wherein the reactor comprises two reaction zones, a first zone for pyrolysing the hydrocarbon into solid carbon and hydrogen gas, and a second zone at a lower temperature than the first zone, for reacting the hydrogen with the nitrogen to form ammonia, and/or for pyrolysing hydrogen sulphide into sulphur and hydrogen gas;

(ii) feeding a stream of molten salt into the pyrolysis reactor to separate the solid carbon from the molten metal.

(iii) collecting a product gas containing ammonia gas and/or hydrogen gas that evolves from the reactor;

(iv) collecting a mixture comprising solid carbon and molten salt;

(v) optionally collecting liquid sulphur;

(vi) separating the mixture obtained in step (iv) to obtain a product comprising solid carbon and separated salt.

In a first preferred embodiment, the method is for producing solid carbon and ammonia gas by molten metal pyrolysis of hydrocarbons. The method according to this embodiment comprises at least the following steps:

(i) feeding a stream comprising hydrocarbon and nitrogen into a pyrolysis reactor comprising a catalytic layer of molten metal, wherein the reactor comprises two reaction zones, a first zone for pyrolysing the hydrocarbon into solid carbon and hydrogen gas; and a second zone for reacting the hydrogen with the nitrogen to for ammonia, and wherein the temperature in the second zone is lower than in the first zone;

(ii) feeding a stream of molten salt into the pyrolysis reactor to separate the solid carbon from the molten metal;

(iii) collecting a product gas containing ammonia gas that evolves from the reactor;

(iv) collecting a mixture comprising solid carbon and molten salt;

(vi) separating the mixture obtained in step (iv) to obtain a product comprising solid carbon and separated salt.

In a second preferred embodiment, the method is for producing solid carbon, liquid sulphur and hydrogen gas by molten metal pyrolysis of hydrocarbons, the method comprising:

(i) feeding a stream comprising hydrocarbon and hydrogen sulphide into a pyrolysis reactor comprising a catalytic layer of molten metal, wherein the reactor comprises two reaction zones, a first zone for pyrolysing the hydrocarbon into solid carbon and hydrogen gas, and a second zone for pyrolysing hydrogen sulphide into liquid sulphur and hydrogen gas, and wherein the second zone is kept at a lower temperature than the first zone;

(ii) feeding a stream of molten salt into the reactor to separate the solid carbon and the liquid sulphur from the molten metal;

(iii) collecting a product gas containing hydrogen gas that evolves from the reactor;

(iv) collecting a mixture comprising solid carbon and molten salt;

(v) collecting liquid sulphur;

(vi) separating the mixture obtained in step (iv) to obtain a product comprising solid carbon and separated molten salt.

In a third preferred embodiment, the method is for producing solid carbon, liquid sulphur and ammonia gas by molten metal pyrolysis of hydrocarbons, the method comprising:

(i) feeding a stream comprising hydrocarbon, nitrogen and hydrogen sulphide into a pyrolysis reactor comprising a catalytic layer of molten metal, wherein the reactor comprises two reaction zones, a first zone for pyrolysing the hydrocarbon into solid carbon and hydrogen gas and for pyrolysing hydrogen sulphide into liquid sulphur and hydrogen gas, and a second zone for reacting the hydrogen with the nitrogen to form ammonia, wherein the second zone is kept at a lower temperature than the first zone;

(ii) feeding a stream of molten salt into the reactor to separate the solid carbon and the liquid sulphur from the molten metal;

(iii) collecting a product gas containing ammonia gas that evolves from the reactor;

(iv) collecting a mixture comprising solid carbon and molten salt;

(v) collecting liquid sulphur;

(vi) separating the mixture obtained in step (iv) to obtain a product comprising solid carbon and separated molten salt.

In molten metal pyrolysis of hydrocarbons, the hydrocarbons are fed through a layer of molten metal catalyst which cracks the hydrocarbon into solid carbon and hydrogen gas. Both these species have a lower density than the molten metal, causing the products to diffuse towards the top of the liquid metal layer. Solid carbon as produced by the method according to the invention is referred to hereinafter as produced carbon. Produced carbon is typically in particulate form, such as having a particle size of at most 500 μm, preferably with a particle size of at most 200 μm, more preferably as at most 100 μm. The carbon particles can be as small as 10 nm. It can be in any form, including any mixture of forms, but is typically glassy carbon, diamond-like carbon, crystalline carbon, paracrystalline carbon, or amorphous carbon, more preferably crystalline carbon, paracrystalline carbon, or amorphous carbon, most preferably crystalline or paracrystalline carbon is formed. Examples of paracrystalline carbon is carbon black. Suitable examples of crystalline carbon are graphite, graphene, fullerenes, nanotubes, and glassy carbon. Carbon black is a preferred paracrystalline carbon, graphite is a preferred crystalline carbon. It is known in the art that control of the temperature at which pyrolysis takes place and selection of metal catalyst steers the form of carbon that is obtained (see Muradov et al. *Int. J. Hydrogen,* 2005, 30:225). For example, varying the temperature within the range 500-1300° C. could give carbon filaments, turbostatic carbon, graphitic carbon and amorphous carbon Such steering of the reaction product is perfectly compatible with the present invention, such that any type of carbon can be obtained by the method according to the invention.

Produced carbon can be used as is, or it can be treated further. For example, it may be used for production of electricity, in carbon fuel cells, or for the production of carbon oxides via partial oxidation in a carbon fuel cell, which can subsequently be used in the production of alcohols such as methanol. In preferred embodiments, the produced carbon is oxidised or partially oxidised in a separate reactor, preferably to be used in further chemical production.

Produced sulphur can be used as is, or it can be treated further. For example, the produced sulphur may be used for large scale production of sulphuric acid or the production of carbon disulphide. The sulphur may also be used for the production of pesticides and fertilizers.

Hydrogen gas as produced by a method according to the invention may also be referred to as produced hydrogen gas. It is a highly combustible diatomic gas. Part or all of the hydrogen gas may be converted to ammonia in the process according to the invention. Ammonia gas as produced by a method according to the invention may also be referred to as produced ammonia. It is a colourless gas with a characteristic pungent smell.

The steps of the method can be performed in any order, such as sequentially or simultaneously, as will be clear to a skilled person. The steps of the method are preferably performed simultaneously, and the method operates (semi-) continuously. In case nitrogen gas is present in the feedstock and the process is for producing ammonia, the lower-temperature second reaction zone should be located on top of (i.e. downstream of) the higher-temperature first reaction zone. When conversion of hydrogen gas to ammonia is not desired and/or when no nitrogen gas is present in the feedstock, the order of the higher-temperature first reaction zone and the lower-temperature second reaction zone can be reversed. Preferably, both reaction zones are located within the same reactor, wherein both layers of molten metal may float on top of each other or may be physically separated. Reactors with multiple reaction zones are known in the art, such as the Kellogg vertical quench reactor. Alternatively, both reaction zones may be present in distinct reactors, between which a fluid connection exists.

The layer of molten salt may be present on top of the first zone and/or the second zone. The molten salt on top of the molten metal of the first high-temperature reaction zone predominantly functions to separate the solid carbon from the molten metal, and thus to facilitate to purification of the produced solid carbon. The molten salt on top of the molten metal of the second low-temperature reaction zone predominantly functions to separate the liquid sulphur from the molten metal, and thus to facilitate to purification of the produced liquid sulphur, and/or to produce ammonia. Preferably, the layer of molten salt is at least present on the downstream zone, which is preferably the second zone. An especially preferred configuration has both reaction zones within the same reactor, with the first high-temperature reaction zone located first (i.e. near the bottom), the second low-temperature reaction zone second (i.e. on top of the first reaction zone) and the layer of molten salt on top of the second reaction zone, more preferably two distinct layers of molten salt are located within the reactor, one on top of each of the reaction zones. In the context of the present invention, "near the bottom" refers to the location in the lower half of the reactor height, i.e. the lowest 50% of the reactor height. Thus, it is preferred that one of the first and second zones is located within the lower half of the reactor (the lowest 50% of the reactor height), and the other zone is located on top of the zone located in within the lower half of the reactor. Most preferably, the zone located in within the lower half of the reactor is the first zone and the zone located on top thereof is the second zone.

Step (i)

In step (i) a stream comprising hydrocarbon and nitrogen and/or hydrogen sulphide (the feedstock) is fed into a pyrolysis reactor comprising a catalytic layer of molten metal, wherein the reactor comprises two reaction zones, a first zone for pyrolysing the hydrocarbon into solid carbon and hydrogen gas, and a second zone at a lower temperature than the first zone for reacting the hydrogen with the nitrogen to form ammonia, and/or for pyrolysing hydrogen sulphide into liquid sulphur and hydrogen gas. The feedstock is preferably fed continuously. It is convenient to feed the feedstock into the bottom or near the bottom of a reactor, so that it can travel a long path through the catalytic layer. Hydrocarbons are well-known, as is their use in molten metal pyrolysis. The hydrocarbon can be a mixture of multiple species of hydrocarbon. In the method according to the invention, the hydrocarbon is preferably a hydrocarbon gas. The hydrocarbon gas may originate from a hydrocarbon stream containing typically liquid hydrocarbons having $C_4$ or greater, such as $C_5$-$C_{10}$ hydrocarbons. Such a stream is typically vaporized prior to being fed to the reactor. In preferred embodiments, the hydrocarbon comprises a $C_1$-$C_4$ hydrocarbon, preferably a $C_1$-$C_4$ alkane, more preferably methane and/or ethane, most preferably methane. Preferred sources of the hydrocarbons are natural gas, syngas, methane, but also fuel gases, refinery gases and other industrial gases comprising hydrocarbons can be used. Highly preferred sources of the hydrocarbons are natural gas, syngas and methane, more preferably natural gas or methane. The hydrocarbon feed may further comprise inert carrier gases, such as argon. Such a carrier gas does not affect to pyrolysis reaction but facilitate the upward movement of the products of the pyrolysis reaction to the top of the molten mass. However, since one mole of methane (or less in case a larger hydrocarbon is used) is converted into two moles of hydrogen gas, the associated increase in volume ensures enough upward movement without the need of a carrier gas. The presence of oxygen is preferably avoided as much as possible, as oxygen may lead to combustion of components (hydrocarbon or hydrogen) in the reactor at pyrolysis conditions. Thus, in a preferred embodiment, the process further comprises the removal of oxygen from the feed if needed. Alternatively worded, the feed is preferably substantially free from oxygen. The present process is able to deal with $CO_2$ impurities. Thus, in one embodiment, the hydrocarbon feed may further contain $CO_2$.

In a preferred embodiment, in step (i) a stream comprising hydrocarbon and nitrogen is fed into a pyrolysis reactor comprising a catalytic layer of molten metal, wherein the reactor comprises two reaction zones, a first zone for pyrolysing the hydrocarbon into solid carbon and hydrogen gas, and a second zone for reacting the hydrogen with the nitrogen to form ammonia. In a preferred embodiment, in step (i) a stream comprising hydrocarbon and hydrogen sulphide is fed into a pyrolysis reactor comprising a catalytic layer of molten metal, wherein the reactor comprises two reaction zones, a first zone for pyrolysing the hydrocarbon into solid carbon and hydrogen gas, and a second zone for pyrolysing the hydrogen sulphide into liquid sulphur and hydrogen gas.

A pyrolysis reactor is a reactor suitable for containing a molten metal catalyst. Such reactors are known in the art, and are described in more detail later herein. A preferred reactor is a reactor according to the invention as described later herein. In a preferred embodiment, the reactor has an inlet for receiving the feedstock at or near the bottom end of the reactor, an outlet for discharging a mixture of carbon and molten salts in a side wall, and an outlet for discharging a product gas at or near the top end. Step (i) typically involves bubbling of the hydrocarbon feed though the molten metal. In a preferred embodiment, the diameter of the bubbles is in the range of 0.1-1000 μm, more preferably in the range of 1-500 μm, most preferably in the range of 10-100 μm. The inventors found that such relatively small bubble sizes improved the hydrodynamics, the productivity of the process, the separation of the products and their quality.

Pyrolysis takes place inside the reactor. Pyrolysis is the thermal decomposition of materials, in this case of the hydrocarbon and optionally of the hydrogen sulphide present in the feedstock, at elevated temperatures, preferably in an inert atmosphere. A skilled person will know how to implement pyrolysis, for example by using argon to create an inert atmosphere, or by configuring the stream of hydrocarbon to spurge the reactor, leading to an inert atmosphere.

Preferably the first reaction zone in the reactor is kept at a temperature in the range of 500-2000° C., more preferably in the range of 600-1500° C., most preferably in the range of 600-1000° C. The second reaction zone has a lower temperature. Preferably, the second reaction zone is kept at a temperature in the range of 200-500° C., more preferably, in the range of 250-400° C., most preferably in the range of 300-400° C. In another embodiment, preferably the second reaction zone is kept at a temperature in the range of 200-600° C., more preferably 200-500° C., even more preferably, in the range of 250-400° C., most preferably in the range of 300-400° C. The reactor can have more than two temperature zones, such as a separation temperature zone in which the layer of molten salt is present. The reaction temperature zones contain the molten metal. The first reaction zone can have different temperatures, to allow thermal cracking at different temperatures. This variability allows adjustment of the quality of produced carbon. The skilled person is capable of adjusting the temperature in the reaction zone in order to optimize the hydrocarbon pyrolysis reaction.

The reaction between nitrogen gas and hydrogen gas occurs at lower temperature. Thus, when a second reaction zone is located on top of the first reaction zone, the produced hydrogen gas and the nitrogen gas from the feedstock react in the second reaction zone to form ammonia according to the Haber-Bosch process. Preferably, the second reaction temperature zone has a temperature in the range of 200-500° C., more preferably, in the range of 250-400° C., most preferably in the range of 300-400° C. In another embodiment, preferably the second reaction zone is kept at a temperature in the range of 200-600° C., more preferably 200-500° C., even more preferably, in the range of 250-400° C., most preferably in the range of 300-400° C.

The pyrolysis of hydrogen sulphide to sulphur and hydrogen already occurs at lower temperature then the temperature in the first reaction zone, but also occurs at the temperature of the first reaction zone. Thus, if the second reaction zone is located below (i.e. upstream of) the first reaction zone, the hydrogen sulphide will pyrolyse in the lower second reaction zone, while the hydrocarbon will move up towards the first reaction zone and be pyrolysed there. Herein, the sulphur may be gaseous at the conditions of the first reaction zone, but will liquefy near or in the layer of molten salt, such that it can be collected in liquid form. When the second reaction zone is located above (i.e. downstream of) the first reaction zone, the hydrogen sulphide will pyrolyse at least partly in the lower first reaction zone and any remaining hydrogen sulphide molecules will pyrolyse in the second reaction zone. Herein, the sulphur may be gaseous at the conditions of the first reaction zone, but will liquefy near or in the second reaction zone or the layer of molten salt, such that it can be collected in liquid form.

Preferably, both reaction zones are kept at a pressure between 30 and 200 bars, more preferably between 30 and 150 bars, most preferably between 30 and 100 bars. Within these ranges, the pressure may vary to allow adjustment of the quality of produced carbon and to maintain the suitable pressure at which thermal cracking and the Haber-Bosch process can occur. The skilled person is capable of adjusting the pressure in the reaction zones in order to optimize the these catalytic reactions.

The separation zone contains molten salt. Preferably, the separation temperature zone has a temperature in the range of 200-1500° C., more preferably in the range of 200-1000° C., even more preferably in the range of 250-800° C., most preferably in the range of 300-450° C. In preferred embodiments, the separation temperature zone has a temperature that is lower than the reaction temperature zone; this can aid in preserving the molten metal layer by trapping any evaporating metal in a molten salt layer.

The catalytic layer of molten metal is a liquid phase wherein pyrolysis takes place. Conveniently, the molten metal can ensure that the hydrocarbon is in an inert atmosphere and thus susceptible to pyrolysis, obviating the need for a further inert gas. Therefore, preferred hydrocarbon are free or substantially free of oxygen. The layer of molten metal can be a layer of pure metal, that is of a single species of metal. In this case the metal should be a catalytic metal capable of catalysing the pyrolysis. The catalytic metal in the layer of molten metal may be dispersed in a continuous matrix as known in the art, such as a matrix of Bi, Ga or K, or salts such as chlorides of Na, K, Fe, Mn and Mg. Such matrix elements are also referred to as "carrier". Metallic catalysts (e.g., Mg, Ni, Pd, Pt) achieve high conversion and selectivity to $H_2$ at moderate temperatures; however, their melting temperatures are extremely high and as solids, they are rapidly deactivated by solid carbon (coke). The metal in the molten metal is selected from the group consisting of Mg, Pd, In, Bi, Sn, Ga, Pb, Ag, Cu, Sn, Pt, Ni, Fe, Co, Au, Mo, Cr, W and V.

In preferred embodiments, the metal in the high-temperature first reaction zone is selected from the group consisting of Mg, Pd, In, Bi, Sn, Ga, Pb, Ag, Cu, Sn, Pt, Ni, Fe, Co and Au, more preferably selected from the group consisting of In, Bi, Sn, Fe, Co and Ga, most preferably Ni, Fe and Co.

The metal in the low-temperature second reaction zone may be distinct from the metal in the first reaction zone. For the pyrolysis of hydrogen sulphide, the metals mentioned above for the first reaction zone are also suitable, but more preferred are metals selected from the group consisting of Ni, Co, Mo, Cu, Cr, W, V and Fe, which offer more active catalyst for the pyrolysis of hydrogen sulphide. Especially sulphides of these metals are preferred. For the formation of ammonia, the metal is preferably selected from the group consisting of In, Co and Fe. Thus, in a preferred embodiment, the metal in the low-temperature second reaction zone is selected from the group consisting of the second zone is selected from In, Co, Fe, Ni, Mo, Cu, Cr, W and V.

The layer of molten metal can also comprise more than one species of metal, thus essentially being a molten alloy. Such liquid alloys preferably comprise catalytically active metals dissolved in low-melting-temperature metal such as Sn, Pb, Bi, In, or Ga. Known equilibrium phase behaviour can be used to produce catalysts that melt at or below 2000° C., preferably 1500° C., more preferably 1100° C. or 1000° C. Preferred alloys are Cu—Sn, Pt—Sn, Pt-bi, Ni—In, Ni—Sn, Ni—Ga, Ni—Pb, Ni—Bi, Co—Sn, Co—Bi, Co—In, Co—Ga, Co—Pb, Fe—Sn, Fe—Bi, Fe—In, Fe—Ga and Fe—Pb. Highly preferred alloys comprise Ni, Fe or Co as catalytic metal. Highly preferred alloys comprise Sn, Pb, Ga, or Bi as low-melting-temperature metal, more preferably Sn or Bi. Catalytically active metal is preferably present at at most 50 mol % of the alloy, more preferably at most 35 mol %, most preferably at about 25-30 mol %, such as 27 mol %. Catalytically active metal is preferably present at at least 5 mol % of the alloy, more preferably at least 10 mol %, even more preferably at least 15 mol %. Catalytically active metal is preferably atomically dispersed.

In one embodiment, not only the temperature differs between the first and second reaction zone, but also the composition of the molten metal layer may be different. For example, when the second reaction zone is for converting hydrogen gas and nitrogen gas into ammonia gas, the metal in the second reaction may contain Fe, Co, Ni or a mixture thereof, while the metal in the first reaction zone may contain Ni without Fe or Co.

In preferred embodiments the feedstock is fed into the pyrolysis reactor at a rate close to the maximum catalytic capacity of the molten metal catalyst or higher, preferably the rate of feeding is at least 90% (by mole per second) of the catalytic capacity of the molten metal. In preferred embodiments the stream of hydrocarbon is fed into the pyrolysis reactor at a rate exceeding the catalytic capacity of the molten metal catalyst, preferably by at least 10% or even at least 50%.

Step (ii)

In step (ii) a stream of molten salt is fed into the pyrolysis reactor to separate the solid carbon from the molten metal, and liquid sulphur when hydrogen sulphide is present in the feedstock. The molten salt is preferably fed in a continuous process. The molten salt has a lower density than the molten metal, and therefore it can form a layer of molten salt on top of the layer of molten metal. This aids in physically separating the produced carbon from the molten metal, because the produced carbon has lower density than the liquid metal and the liquid salt, so it will float on top of the combined system. Furthermore, the presence of molten salt in the catalytic layer of molten metal is found not the affect the catalytic capacity of the molten metal.

Accordingly, in preferred embodiments step (ii) involves the formation of a layer of molten salt which has a lower density than the layer of molten metal. More preferably step (ii) involves the replenishment of a layer of molten salt, for example when a layer of molten salt is removed from the reactor as part of the method. Most preferably, as described later herein, a layer of molten salt is present in the reactor, which is continuously collected and which is replenished by the stream of molten salt of step (ii).

The stream of molten salt can be fed into the pyrolysis reactor below or in the layer of molten metal, so that the molten salt moves upwards through the layer of molten metal to form a layer of molten salt on top of the molten metal. As such, the upward movement of the molten salt agitates the molten metal. This facilitates diffusion of produced carbon, promoting its accumulation in or on the molten salt layer. The stream of molten salt can also be fed above or in the layer of molten salt to minimize temperature loss when the molten salt is at a lower temperature than the molten metal. The stream of molten salt can also be fed into the pyrolysis reactor in a single batch, to form a layer of molten salt that is not removed or replenished in a continuous fashion.

A single salt or a mixture of salts can be fed in step (ii). Preferred salts are metal salts, such as metal halides, metal carbonates, metal nitrates and metal sulphates. The salt preferably comprises a metal selected from Li, Mg, Zn, Cu, Ni, Na and K, preferably selected from Ni, Na and K, preferably the salt comprises Na or K. Alternatively, the metal may be selected from Mg, Zn, Cu, Ni, Na and K, and preferably is selected from Mg and Zn. Preferred anions are small anions, preferably monoatomic anions or inorganic anions having preferably at most 7, 5, or 4 atoms, for example comprising Br, Cl or $NO_3$. Preferred salts are selected from the group consisting of $KNO_3$, $NaNO_3$, NaCl, KCl, LiCl, $MgCl_2$, CuCl, $NiCl_2$, $ZnCl_2$, $ZnBr_2$ and NaBr, more preferably selected from the group consisting of $KNO_3$, $NaNO_3$, NaCl, KCl, LiCl, $MgCl_2$, $ZnCl_2$, $ZnBr_2$ and NaBr. An alternative list of preferred salts is selected from KCl, $MgCl_2$, CuCl, $NiCl_2$, $ZnCl_2$ and NaBr. These salts were found to have advantageous properties in terms of density and wettability. These salts have been tested in the process according to the invention, and no metal was found in the carbon product, which is indicative of perfect separation of metal and carbon by the layer of molten salts. Especially preferred are $MgCl_2$ and $NiCl_2$. Preferred mixtures of salt are $KNO_3$ and $NaNO_3$, NaCl and KCl, KCl and $KNO_3$, NaCl and $NaNO_3$. Mixtures of salts comprising two species of salts preferably comprise those species in a weight ratio in the range of 40:60-60:40, more preferably at about 50:50. Possibly, an eutectic mixture of salts is used, which melt at a lower temperature then the individual salts.

In one embodiment, the salt is selected based on its stability and heat capacity. As the skilled person will understand, the molten salt should be stable at the temperature and conditions within the reactor. Further, it is convenient to use a salt with a low heat capacity, to reduce energy requirements in its melting or heating. Preferred molten salts melt reversibly. In this context, a salt is considered stable at a temperature when after 1 hour at that temperature at most 10%, more preferably at most 2%, most preferably at most 0.1% of the salt has decomposed. Assays for salt stability are widely known, for example the stability of nitrate ions can be assayed using the nitrate reductase enzymatic assay. In a preferred embodiment, the salt has a heat capacity of at most 2 J/K, more preferably at most 1.7 J/K, most preferably at most 1.6 J/K. Preferred salts or mixtures of salts are liquid at about 1000° C. Preferred salts or mixtures of salts have a melting point above 90° C., preferably above 150° C., more preferably above 250° C., or even above 400° C. Most preferably, the melting temperature is above 500° C. It is further preferred that the density of the molten salt is higher than the density of liquid sulphur at the conditions in the molten salt layer, such that the liquid sulphur will accumulate on top of the molten salt layer. At the melting point of sulphur (about 115° C.), its density is 1.8 g/mL.

The molten salt separates the produced carbon from the catalytic layer of molten metal and promotes dissociation between the molten metal and the produced carbon, and it can trap evaporated or evaporating metal to allow its reuptake in the molten metal layer. Thus the molten salt protects the catalytic layer of molten metal, in that it helps maintain its catalytic ability or prevents deterioration of its catalytic ability. Thus the layer of molten salt can act as a protecting layer. In preferred embodiments the carbon product has a higher affinity for the molten salt than for the molten metal. In some embodiments the method according to the invention, wherein the protecting layer has a solubility for hydrogen gas which is at least substantially equal to that of the catalytic layer, preferably wherein the protecting layer has a higher solubility for hydrogen gas than the catalytic layer.

Step (iii)

In step (iii), a product gas that evolves from the reactor is collected. The product gas is the gas that evolves from the molten metal layer and has passed through the molten salt layer. The product gas contains ammonia gas and/or hydrogen gas. It may further contain unconverted hydrocarbon gas, unconverted nitrogen gas, unconverted hydrogen sulphide and possibly minor amounts or intermediate or by-products. Preferably the product gas does not comprise $CO_2$. The collected product gas can be used in further applications, for example as a fuel source or for the formation of valuable compounds.

Preferably and in case the feedstock comprises nitrogen gas, in step (iii) a product gas containing ammonia gas evolves from the reactor and is collected. It can be pure or substantially pure ammonia gas, but it can also comprise unconverted nitrogen gas and/or hydrogen gas, unconverted hydrocarbon gas and possibly minor amounts or intermediate or by-products. In case the content of the feedstock is such that the molar ratio of produced hydrogen gas to nitrogen gas present in the feedstock is 3 to 1, the conversion into $NH_3$ may be complete and no residual nitrogen gas and/or hydrogen gas is present. The product gas may thus be substantially pure $NH_3$. Preferably and in case the feedstock does not comprise nitrogen gas, in step (iii) a product gas containing hydrogen gas evolves from the reactor and is collected. It can be pure or substantially pure hydrogen gas.

Preferably, the product gas is treated further. In a preferred embodiment, the method according to the invention further comprises separating the product ammonia gas obtained in step (iii) into unconverted hydrocarbon gas, unconverted hydrogen and/or nitrogen gas, and ammonia gas, to obtain purified ammonia gas and recovered hydrocarbon and nitrogen. In an alternative preferred embodiment, the method according to the invention further comprises separating the product hydrogen gas obtained in step (iii) into unconverted hydrocarbon gas and hydrogen gas, to obtain purified hydrogen gas and recovered hydrocarbon. If needed, unconverted hydrogen sulphide may be removed from the gaseous product, although given the pyrolysis in the molten metal layers, this is usually not needed. Separation of gases is known in the art, and a skilled person can select suitable methods for separation of ammonia or hydrogen gas from the unconverted gases. Suitable techniques include cryogenic distillation or an adsorption to a sorbent, wherein use of a sorbent is preferred. Examples of sorbent materials are zeolites, metal-organic frameworks, activated carbon, and molecular sieves, preferably zeolites, metal-organic frameworks, and molecular sieves, most preferably zeolites. A highly preferred technique is pressure swing adsorption (PSA) wherein adsorbent material is used as a trap that at high pressure preferentially adsorbs either $H_2$ or the unconverted hydrocarbon and optionally the unconverted hydrogen sulphide, afterwhich low pressure is used to desorb the adsorbed gas. Forthe separation of $NH_3$, an aqueous quench may be used which results in the formation of aqueous ammonia. Alternatively, membrane based and adsorption based methods may be applied and can be adjusted based on the desired purity of the products. The purified hydrogen gas is preferably at least 90% pure, more preferably at least 95%, even more preferably at least 98%, most preferably at least 99% pure, such as 99.9% pure or essentially pure. The purified ammonia gas is preferably at least 70% pure, more preferably at least 90%, even more preferably at least 95%, most preferably at least 99% pure.

The recovered hydrocarbon gas can be used for any application. Conveniently it is reused in the method according to the invention. In preferred embodiments, the method according to the invention is provided, wherein the recovered hydrocarbon is recycled back into the pyrolysis reactor as part of step (i). The recovered hydrocarbon can be fed into the stream of hydrocarbon of step (i) before it enters the pyrolysis reactor, or it can be separately fed into the pyrolysis reactor. Preferably the recovered hydrocarbon is fed into the stream of hydrocarbon of step (i).

Step (iv)

The method according the invention typically further comprises step (iv) wherein solid carbon is collected, preferably as a mixture with molten salt. The solid carbon that is collected is the produced carbon resulting from the pyrolysis of the hydrocarbon. As a result of this collection step, produced carbon is removed from the reactor.

Typically, a mixture comprising produced carbon and molten salt is collected. This has the advantage of allowing convenient collection of substantially all of the produced carbon without also removing molten metal from the reactor, because the carbon is physically separated from the metal catalyst by the molten salt layer. In this context the molten salt can be considered sacrificial, in that it is removed together with the produced carbon to prevent undesired removal of molten metal. As such, the molten salt layer is preferably replenished as part of step (ii).

In preferred embodiments, a layer of molten salt is present in the pyrolysis reactor, and step (iv) involves skimming to collect the produced carbon and part the layer of molten salt, such that substantially all of the produced carbon is removed from the reactor. Preferably, no molten metal is collected as part of the skimming. Accordingly, the layer of molten salt is preferably configured to have a height that is sufficient to allow skimming of its surface without said skimming interfering with the underlying layer of molten metal. Typically, about 10-60% of the total height of the layer of molten salt is removed during step (iv), preferably 25-55% of the total height is removed. In this context, removal of the produced carbon refers to the removal of the solid carbon that has accumulated on top of the layer of molten salt. Skimming can be performed using any skimmer known in the art, as long as the skimmer is suitable for use at temperatures required for the method according to the invention. Suitable skimmers are for example disclosed in U.S. Pat. No. 4,191,559 and in WO 2010/061022.

Step (v)

The method according to the invention further comprises step (v) wherein liquid sulphur is collected, preferably as a separate layer above the molten salt layer. Most preferably, the liquid sulphur separation takes place in the molten salt layer above the second low temperature reaction zone. Especially preferred is the use of two molten salt layers, one on top of the first high temperature reaction zone to collect solid carbon, and one on top of the second low temperature reaction zone to collect liquid sulphur. The liquid sulphur that is collected is the produced sulphur resulting from the pyrolysis of hydrogen sulphide. As a result of this collection step, produced sulphur is removed from the reactor. Preferably, a layer of pure liquid sulphur or substantially pure liquid sulphur is collected. In this context, the sulphur content in the produced liquid sulphur is preferably at least 90%, more preferably at least 95%, even more preferably at least 99% or even higher. This has the advantage of allowing convenient collection of substantially all of the produced sulphur without also removing substantial amounts of the molten metal from the reactor as the density of the layer of liquid sulphur is lower than the density of the molten metal layer and will float on top of the molten metal. The layer of liquid sulphur is conveniently accumulated on top of the layer of molten salt, when the density of the molten salt is higher than the density of the liquid sulphur. This provides a protective layer on the molten metal and avoids residual traces of molten metal in the liquid sulphur layer. Alternatively, when the liquid sulphur is dispersed within the molten salt, it is collected together with molten salt layer and optionally the solid carbon. After which these components are separated downstream, see step (vi).

In preferred embodiments, a layer of liquid sulphur is present in the pyrolysis reactor, and step (v) involves collection of the produced sulphur through a separate outlet that discharges a mixture of liquid sulphur in a side wall which is positioned below the outlet for discharging a mixture of carbon and molten salts. The collected liquid sulphur can, if needed, be separated from residual amounts of the molten metal, e.g. by cooling the mixture to below the melting point of the metal but above the melting point of the sulphur, and separating the solid metal from the liquid sulphur, preferably by filtration. Preferably, the mixture is cooled to a temperature in the range of 100-400° C. Preferably, all of the produced sulphur is removed from the reactor and the solid metal is recycled into the reactor as part of step (i). Preferably, the collection of molten metal and/or solid carbon as part of step (v) is avoided as much as possible.

Within the reactor, $CS_2$ may be formed as co-product by reaction of carbon with sulphur atoms. $CS_2$ is gaseous at the conditions within the reactor and will be collected in the gaseous product stream. If desired, $CS_2$ may be removed from the gaseous product stream, e.g. using a cold trap to cool the gas to below the boiling point of $CS_2$ (46° C. at ambient pressure) and collect $CS_2$ as condensate.

Step (vi)

When a mixture is obtained in step (iv), it can be used as deemed fit, preferably by further treatment to obtain pure solid carbon. Accordingly, the method according to the invention preferably further comprises step (vi) wherein the mixture obtained in step (iv) is separated. The separation of step (vi) obtains a product comprising solid carbon and salt. The salt that is separated from the solid carbon in step (vi) is also referred to as "separated salt". In a preferred embodiment, this is separated molten salt. Step (vi) can also be referred to as separating the mixture obtained in step (iv)

into a product comprising solid carbon and separated molten salt. Such separation can be performed in any suitable way known in the art.

The product comprises the produced carbon and is preferably pure or substantially pure carbon. In this context, the carbon content of the produced carbon is preferably at least 90%, more preferably at least 95%, even more preferably at least 99%, or even higher. This pure carbon can be used as is, or can be subjected to further treatment, such as even further purification or conversion into carbon-containing compounds.

In a preferred embodiments, the separation of step (vi) is achieved by filtering the mixture of molten salt and produced carbon obtained in step (iv) through a filter. Molten salt is recovered as permeate and can be used as deemed fit. Preferably, it is recycled into the reactor. It can be fed into the reactor as a separate stream, but preferably it is fed into the stream of molten salt of step (ii). The solid carbon product is obtained as retentate. The retentate may still contain traces of molten salt that adhere to the carbon particles. Such last traces of salt may be removed from the produced carbon, e.g. by washing. Accordingly, step (vi) preferably involves separating solid carbon from the separated salt by filtering and/or washing the mixture with an aqueous liquid, using a filter such as a metal filter or a ceramic filter, to obtain a product comprising solid carbon and recovered salt, as permeate and/or dissolved in the washing liquid. Any solvent (or mixture) can be used as washing liquid, as long as the salt dissolves therein. The skilled person is able to select an appropriate washing liquid in which the salt that is used dissolves. Preferably, the washing liquid is water, although ethers and alcohols can in some instances also be useful.

Filters suitable for use in step (vi) are filters that can be used at the temperatures of the method according to the invention, in particular the temperature at which separation occurs. Suitable filters are metal membranes or ceramic membranes, preferably ceramic membranes. The filter preferably has a pore size suitable for retaining the solid carbon particles. The filter preferably has a pore size that is sufficiently large to allow expedient permeation of the molten salt, or of the aqueous liquid comprising dissolved separated salt. The pore size can depend on the size of the produced carbon particles. A skilled person can select a suitable filter. Preferred filters have a pore size of at most 500 μm, preferably of at most 100 μm, more preferably of at most 10 μm, most preferably of at most 1 μm. In a preferred embodiment, the pore size is in the range of 0.5-500 μm.

In case the liquid sulphur is dispersed within the salt layer, the separated salt will still contain sulphur. Typically, the separated salt may be cooled to solidify the salt while keeping the sulphur in the liquid state. The liquid sulphur may then be separated from the salt by filtering or by gravity separation, such as a gravity settler or a cyclone. The separated salt, optionally after removal of liquid sulphur, can be used in further applications, or it can be recycled into the method according to the invention. In preferred embodiments, the salt is recovered and recycled into the reactor as part of step (ii).

Reactor

In another aspect the invention provides a reactor for performing molten metal pyrolysis of hydrocarbons (1). In a first preferred embodiment, the reactor is for producing solid carbon and ammonia gas by molten metal pyrolysis of hydrocarbons. The reactor according to this embodiment comprises: The reactor according to the invention comprises:

(a) a vessel (4) for holding a catalytic layer of molten metal (5,6) and a layer of molten salt (7), (b) an inlet (3) for receiving the feedstock comprising hydrocarbon and nitrogen and/or hydrogen sulphide (1) at or near the bottom end of the vessel (4), a first outlet (14) for discharging a mixture of solid carbon and molten salts in a side wall of the vessel (4), and a second outlet (9) for discharging a product gas at the top end of the vessel;

(c) a catalytic layer of molten metal comprising two reaction zones (5, 6) with different temperatures;

(d) means (15) for separating a mixture of solid carbon and molten salts discharged from the first outlet (14);

(e) means for heating the reactor to a first temperature in a first zone and to a second temperature in a second zone, wherein the first temperature is higher than the second temperature;

(f) a recycle (18) for recycling molten salts from the separator (15) to the vessel (4).

In a first preferred embodiment, the reactor is for performing molten metal pyrolysis of hydrocarbons to produce solid carbon, and in addition is also for producing ammonia gas. The reactor according to this embodiment comprises:

(a) a vessel (4) for holding a catalytic layer of molten metal (5,6) and a layer of molten salt (7), (b) an inlet (3) for receiving the hydrocarbon and nitrogen (1) at or near the bottom end of the vessel (4), a first outlet (14) for discharging a mixture of solid carbon and molten salts in a side wall of the vessel (4), and a second outlet (9) for discharging a product gas comprising ammonia at the top end of the vessel;

(c) catalytic layer of molten metal comprising two reaction zones with different temperatures;

(d) means (15) for separating a mixture of solid carbon and molten salts discharged from the first outlet (14);

(e) means for heating the reactor to a first temperature in a first zone and to a second temperature in a second zone, wherein the first temperature is higher than the second temperature and the first zone is located upstream of the second zone;

(f) a recycle (18) for recycling molten salts from the separator (15) to the vessel (4).

In a second preferred embodiment, the reactor is for performing molten metal pyrolysis of hydrocarbons and hydrogen sulphide to produce solid carbon, hydrogen gas and liquid sulphur.

The reactor according to this embodiment comprises:

(a) a vessel (4) for holding a catalytic layer of molten metal (5,6) and a layer of molten salt (7), (b) an inlet (3) for receiving the hydrocarbon and hydrogen sulphide (1) at or near the bottom end of the vessel (4), a first outlet (14) for discharging a mixture of solid carbon and molten salts in a side wall of the vessel (4), and a second outlet (9) for discharging a product gas comprising hydrogen at the top end of the vessel, and a separate outlet (14a) for discharging a mixture of liquid sulphur and molten metal in a side wall which is positioned below the outlet (14) for discharging a mixture of carbon and molten salts;

(c) catalytic layer of molten metal comprising two reaction zones with different temperatures;

(d) means (15) for separating a mixture of solid carbon and molten salts discharged from the first outlet (14); and (e) means for heating the reactor to a first temperature in a first zone and to a second temperature in a second zone, where the first temperature is higher than the second temperature.

(f) a recycle (18) for recycling molten salts from the separator (15) to the vessel (4).

Preferably, the reactor comprises a separate outlet (14a) for discharging liquid sulphur in a side wall. More preferably, both reaction zones (5, 6) contains an own layer of molten salt (7a, 7b), and more preferably the reaction zones are physically separated and/or located in distinct reactors (4a, 4b).

The reactor according to the invention is configured for molten metal pyrolysis of hydrocarbons using a method according to the invention, and it can be seen as a conventional molten metal pyrolysis reactor having a vessel (4) and an inlet (3) and an outlet (9) for discharging product gas, characterized in that it features an outlet (14) for discharging a mixture of carbon and salt, a catalytic layer of molten metal comprising two reaction zones (5, 6) with different temperatures, means (15) for separating the mixture of produced carbon and molten salts, means for heating the reactor to a first temperature in a first zone and to a second temperature in a second zone, wherein the first temperature is higher than the second temperature; and a recycle (18) for recycling molten salts from the separator (15) to the vessel (4). Inlet (3) is located at or near the bottom end of the vessel (4). Herein, the bottom end of the reactor refers to the lower part, typically the lowest 10% of the reactor height. Most preferably, inlet (3) is located at the bottom of the vessel (4), in other words it is located in the bottom of the vessel (4).

Preferably, the first and second reaction zone are part of one reactor. A suitable example is depicted in FIG. 2. Alternatively, In case of two separate reactors for respectively the first and second reaction zone, the carbon separation with molten salt is part of the reactor comprising the first reaction zone (5) and the second reaction zone (6), for pyrolysing hydrogen sulphide and/or forming ammonia, is part of a distinct reactor. A suitable example is depicted in FIG. 3.

The vessel (4) can be any vessel suitable for performing molten metal pyrolysis. Suitable materials for such a vessel or for other components of the reactor according to the invention are known in the art. Preferred materials are quartz, stainless steel, and ceramics. A preferred stainless steel is SAE 304 stainless steel.

In preferred embodiments, the vessel (4) is a bubble column reactor. A bubble column reactor is a reactor in which a gas can be bubbled through liquid layers, which supports the transfer of the solid carbon from the molten metal layer to the molten salt layer. Preferred bubble columns have means for increasing the surface area of the hydrocarbon stream, such as a frit, preferably a stainless steel frit. A bubble column preferably has an aspect ratio wherein it is at least 5 times as high as it is wide, preferably at least 8 times as high as it is wide, more preferably at least 10 times as high as it is wide. Preferred ratios range from about 150:12 to about 40:1. The height and diameter of the bubble column depend on the envisaged volume of the molten metal catalyst layer and the envisaged volume of any molten salt layer. A skilled person can select a suitable bubble column. Examples of possible lengths for the longest aspect of a bubble column are 150 mm and 1100 mm. The bubble column can have any shape, such as straight, curved, U-shaped, or L-shaped. Preferably a bubble column is straight or substantially straight. In case the first and second reaction zones are located in distinct reactors, each of the reactors may be as defined herein.

The reactor according to the invention comprises means for heating the reactor to a first temperature in a first zone and to a second temperature in a second zone, wherein the first temperature is higher than the second temperature. These means for heating should be suitable for achieving temperatures required for performing the method according to the invention. Preferably, a reactor according to the invention is configured to have product streams of similar temperatures be integrated near each other. The reactor according to the invention can be in an oven or furnace. Preferably, heating means are integrated in the reactor according to the invention. Preferred heating means are ovens, furnaces, heating sleeves, and heating blocks. In preferred embodiments, heating means surround the vessel (5), preferably an electric arc furnace. Heating means can be powered using an external power source such as electricity, or they can be powered using the hydrocarbon stream or part of the hydrocarbon stream, or using recovered hydrocarbon, or using product gas or using produced hydrogen gas. In preferred embodiments is provided the reactor according to the invention, wherein the reactor is heated using the hydrocarbon, hydrogen gas or electricity. The skilled person understands how the heating means, such as the preferred ones recited above, can be powered by hydrocarbon, hydrogen gas or electricity. In a preferred embodiment, the heating means are powered by hydrocarbon and/or hydrogen gas, which is burned to generate the heat that is needed to heat the reactor.

A reactor according to the invention can be used in a centralized large scale systems, for example in a petrochemical complex or at an industrial site or plant. Preferably a reactor according to the invention is used as a decentral system, or as part of a decentral system, for example at a petrol station or at a hydrogen gas supply location.

In the reactor according to the invention pumps can be present, for example as depicted in FIGS. 2 and 3. A skilled person will be able to select any suitable pump. Alternately, pressure can be generated via other means, such as pre-pressurized containers, to promote flow of streams in the reactor.

Produced gas evolves from the molten layers and can collect in a headspace (8), along with possible unconverted hydrocarbon gas. This headspace (8) can be cooled to prevent possible reactions, oxidation of reactor components, and/or evaporation of molten salt or of molten metal. Such cooling can be done via any suitable cooling means, for example using a fan that blows in external air.

The product mixture can be collected via an outlet (9) for discharging a product gas comprising hydrogen and/or ammonia at the top end of the reactor (4), after which it can be transported with an optional pump compressor (10) towards means (11) for separating pure hydrogen and/or ammonia gas (12) from unconverted gases (13). The recovered hydrocarbon gas can be fed into the original stream of hydrocarbon (1) for instance at a junction (26) before the stream enters the reactor (4). Means (11) for separating pure hydrogen and/or ammonia gas from unconverted hydrocarbon have been described elsewhere herein. Preferred means comprise adsorbent materials, such as a pressure swing adsorption unit, an aqueous quench and membrane based methods.

The reactor has an outlet (14) for discharging a mixture of carbon and molten salts in a side wall. To promote discharging of carbon through this outlet (14), the reactor preferably has collecting means such as a skimmer for skimming produced carbon. It is highly preferred that a reactor according to the invention has a skimmer, as this allows the convenient discharging of a mixture of salt and produced carbon. Further conveying of this mixture is typically driven or entrained by bubble lift flow, by physical skimmer or by reducing pressure downstream. Such a mixture can be passed through separation means (15) such as a filter, which is preferably present in the reactor according to the invention. Filters have been described elsewhere herein. After separation the permeate, separated salt, can be conveyed (16) into a salt vessel (17), both of which are preferably present in the reactor according to the invention, and via recycle (18) back into the reactor (4) for replenishing the molten salt layer, which is preferably present in the reactor according to the invention. Recycles are common in the art of chemical reactors, wherein gases or liquids that are not reacted are re-introduced in the reactor to perform their task again. The recycle (18) may take any form, such as a conduit from vessel (17) to the reactor, wherein vessel (17) or the conduit may be equipped with heating means to heat the salt to the appropriate temperature of the molten salt within the reactor. As described earlier herein, it is convenient when the salt layer is continuously replenished, as the method according to the invention is preferably a continuous method. When salt is collected during collection of produced carbon, the salt layer depletes. Replenishment ensures that the process can be continuously performed. This salt vessel is convenient for storage of salt that has been recovered via separation means (15), or via separations means (21).

In case the liquid sulphur is dispersed within the mixture of carbon and salt, the salt separated in (15) will still contain sulphur. Typically, the separated salt may be cooled to solidify the salt while keeping the sulphur in the liquid state. The liquid sulphur may then be separated from the salt by filtering or by gravity separation, such as a gravity settler or a cyclone, after which the salt may be conveyed into a salt vessel (17). The reactor may also have a separate outlet (14a) for discharging liquid sulphur, which may contain residual salt. This mixture may be treated in the same way, i.e. the separated salt may be cooled to solidify the salt while keeping the sulphur in the liquid state. The liquid sulphur may then be separated from the salt by filtering or by gravity separation, such as a gravity settler or a cyclone, after which the salt may be conveyed into a salt vessel (17). Liquid sulphur (31) can then be discharged as one of the products of the reactor.

Carbon is retained by separation means (15). Often a mixture of carbon and salt is retained. This mixture can be further treated in a washing vessel (20), which is preferably present in the reactor according to the invention, to which it is optionally transported via a pump (19). The washing vessel is supplied by a stream of aqueous solution (26) which for example supplies water. In the washing vessel, any residual salt is dissolved and solid carbon is suspended or precipitates. The suspension comprising water, salt, and carbon can then be separated using separation means (21) such as a filter, which is preferably present in the reactor according to the invention. Separated carbon is optionally dried using drying means (22), which is preferably present in the reactor according to the invention, after which pure solid carbon (23) is obtained. Aqueous solution comprising salt obtained via separation means (21) can be dried using drying means (24), which is preferably present in the reactor according to the invention after which the salt can be transported back to a salt vessel (17) optionally using a pump (25). The drying means can be any drying means known in the art, for example an oven or a heated conveyor belt.

General Definitions

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one". The word "about" or "approximately" when used in association with a numerical value (e.g. about 10) preferably means that the value may be the given value more or less 1% of the value.

The present invention has been described above with reference to a number of exemplary embodiments. Modifications and alternative implementations of some parts or elements are possible, and are included in the scope of protection as defined in the appended claims. All citations of literature and patent documents are hereby incorporated by reference.

EXAMPLES

Example 1—Molten Metal Hydrolysis of a Hydrocarbon Stream

Figure 1A:
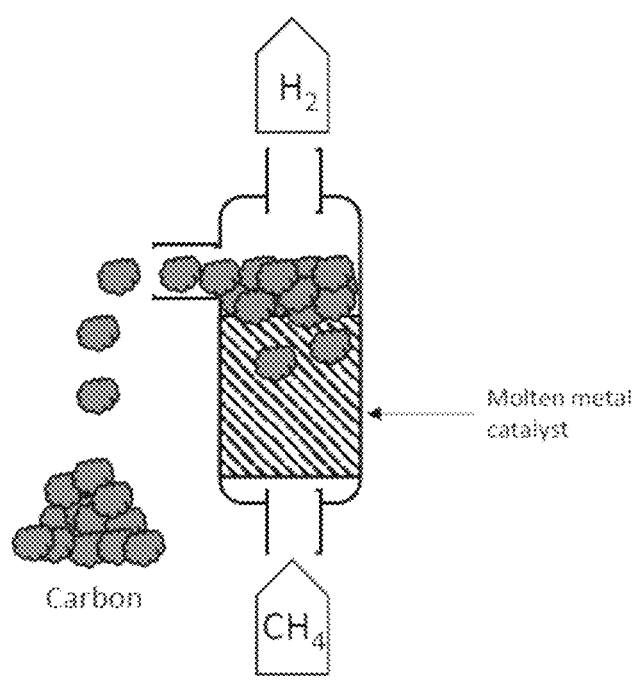
FIG. 1 (A) State of the art reactor for hydrocarbon conversion, drawn here as $CH_4$, to $H_2$ and carbon. The hydrocarbon is bubbled through a layer of molten metal catalyst (hatched) after which gaseous $H_2$ product evolves from the reactor. Solid carbon product as a lower density than the molten metal and accumulates at the top, where it can be collected. Carbon that is not collected can clog the reactor. Collected carbon is easily contaminated with metal. (B) Use of molten salt in a method according to the invention. The molten salt separates the produced solid carbon from the molten metal, preventing accumulation of solid carbon on the catalyst. Collected carbon is not contaminated with metal, while any potential residual salt can be conveniently washed away. Not depicted here is the use of two reaction zones within the layer of molten metal.
Figure 1B:
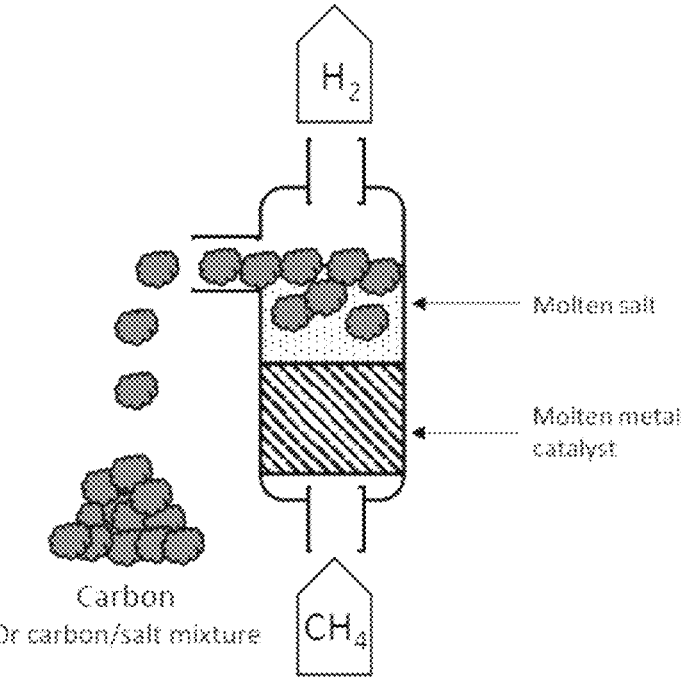
Figure 2:
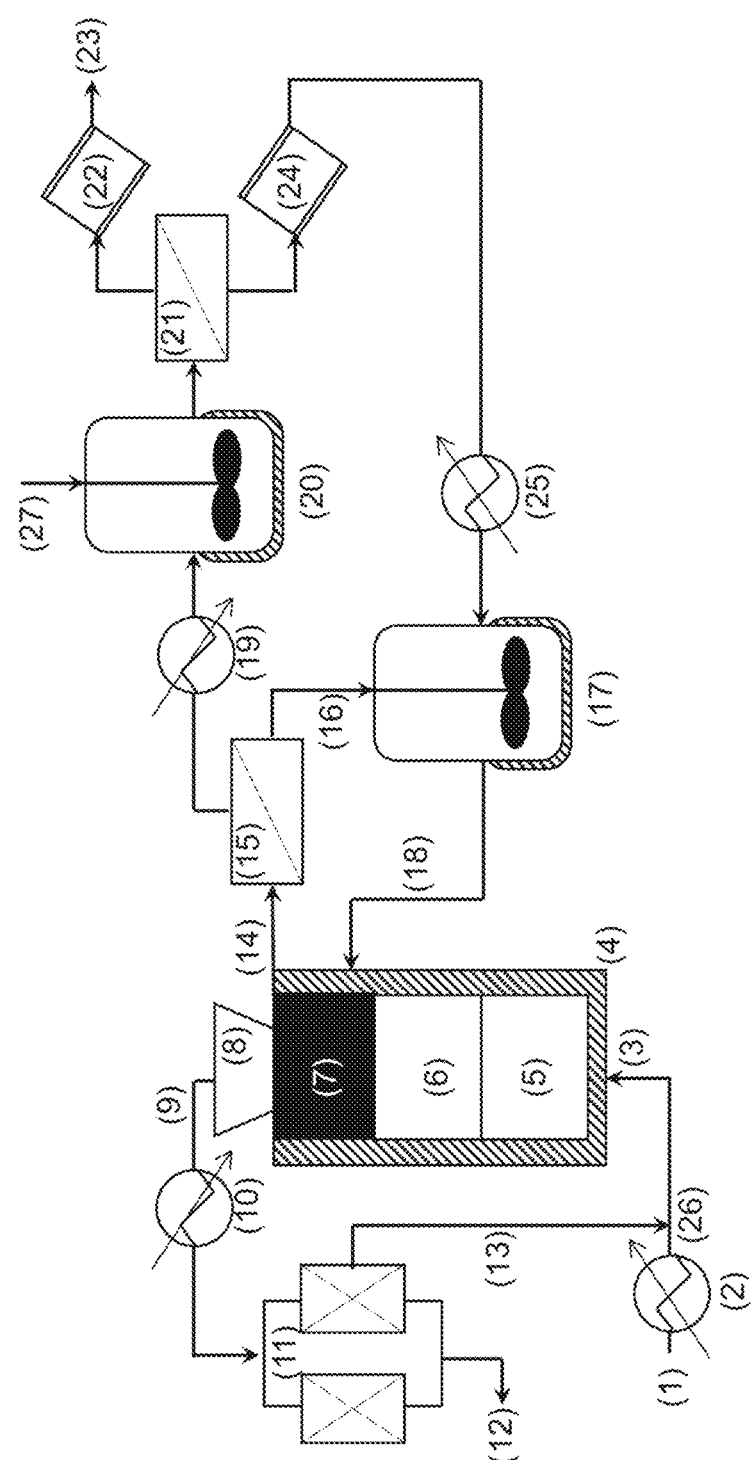
FIG. 2 depicts a preferred reactor for continuous process for production of solid carbon and $NH_3$ from hydrocarbon and nitrogen gas using molten salt. A stream of hydrocarbon and nitrogen (1) is fed, optionally using a pump compressor (2), towards an inlet (3) for receiving the hydrocarbon at the bottom of a pyrolysis reactor (4). During operation, two layers of molten metal catalyst (high temperature layer (5) and low temperature layer (6)) and a layer of molten salt (7) are present in the reactor (4). In layer (5), the hydrocarbon is pyrolysed into solid carbon and hydrogen gas, which move up to layer (6), where the hydrogen gas reacts with nitrogen gas to form $NH_3$. Produced ammonia gas evolves from the molten layers and can collect in a headspace (8), along with possible unconverted hydrocarbon, hydrogen and/or nitrogen gas. The product mixture can be collected via an outlet (9) for discharging a product gas comprising ammonia at the top end of the reactor (4), after which it can be transported with an optional pump compressor (10) towards means (11) for separating pure ammonia gas (12) from the unconverted gases (13). These recovered gases can be fed into the original stream of hydrocarbon (1) for instance at a junction (26) before the feed enters the reactor (4). The reactor has an outlet (14) for discharging a mixture of carbon and molten salts in a side wall, which mixture can be passed through separation means (15) such as a filter, after which separated salt (16) can be conveyed into a salt vessel (17) and recycled back into the reactor (4), optionally after increasing the temperature, via an inlet (18) for replenishing the molten salt layer. Carbon can be further treated in a washing vessel (20), to which it is transported via a pump (19), to remove residual traces of salt. The washing vessel is supplied by a stream of aqueous solution (27) after which the suspension comprising water, salt, and carbon is separated using separation means (21) such as a filter. Separated carbon is optionally dried using drying means (22) after which pure solid carbon (23) is obtained. The washed and dissolved salts can be dried using drying means (24) after which the salt can be transported back to a salt vessel (17) using a pump (25).
Figure 3:
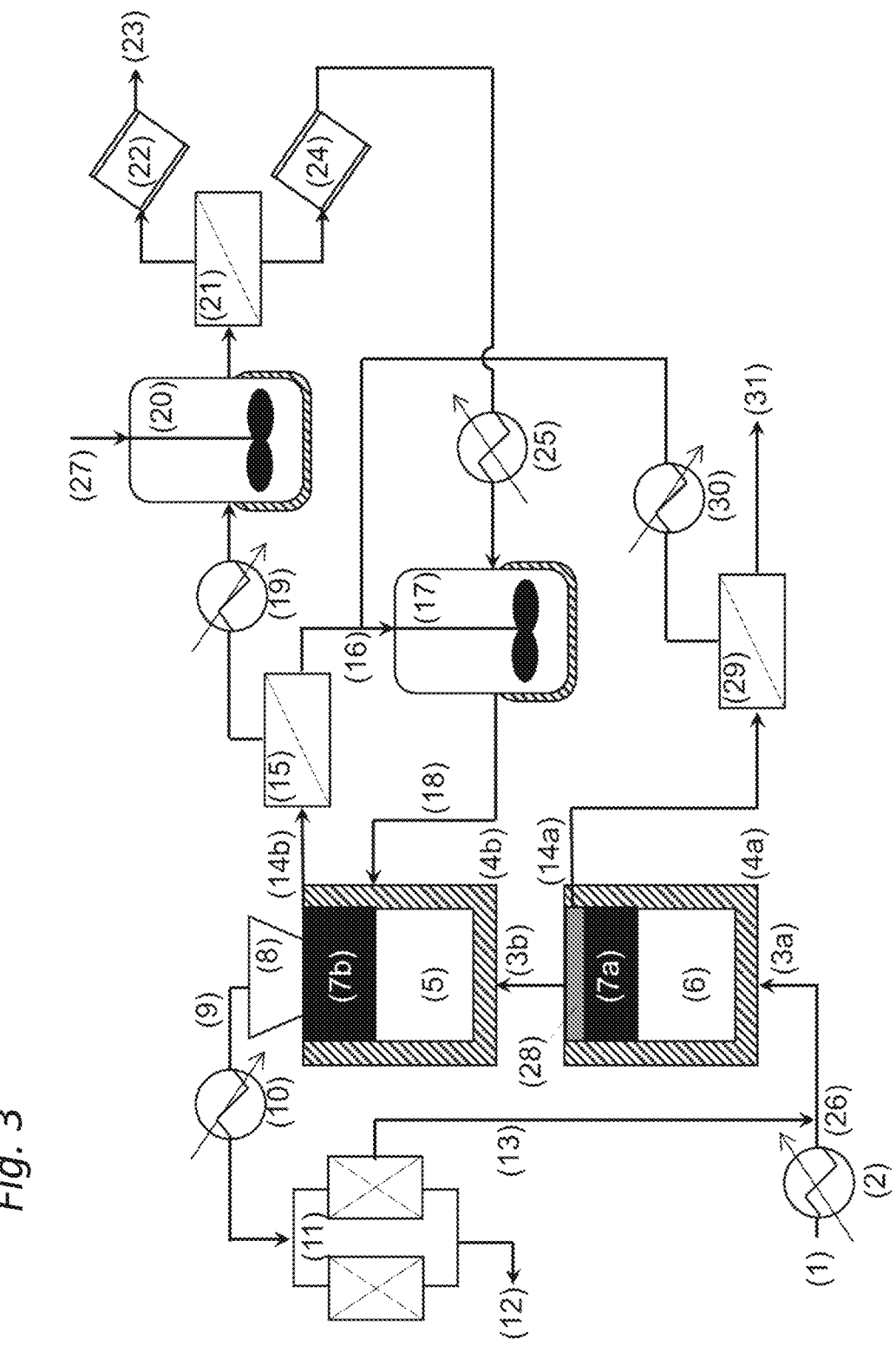
FIG. 3 depicts a preferred reactor for continuous process for production of solid carbon and liquid sulphur from hydrocarbon and hydrogen sulphide gas using molten salt. A stream of hydrocarbon and hydrogen sulphide (1) is fed, optionally using a pump compressor (2), towards an inlet (3a) for receiving the hydrocarbon at the bottom of a first pyrolysis reactor (4a), containing a first layer of molten metal catalyst (low temperature layer (6)) and a layer of molten salt (7a). During operation, a layer of liquid sulphur (28) accumulates on top of salt layer (7a). In layer (6), the hydrogen sulphide is pyrolysed into liquid sulphur and hydrogen gas, which move up through reactor (4a). The liquid sulphur is discharged via an outlet (14a) in the side wall of the reactor. The gaseous product, hydrogen gas and unreacted hydrocarbon, are led via inlet (3b) to pyrolysis reactor (4b), containing a second layer of molten metal catalyst (high temperature layer (5)) and a layer of molten salt (7b). In layer (5), the hydrocarbon is pyrolysed into solid carbon and hydrogen gas, which move up through reactor (4b). Produced hydrogen gas evolves from the molten layers and can collect in a headspace (8), along with possible unconverted hydrocarbon and/or hydrogen gas. The product mixture can be collected via an outlet (9) for discharging a product gas comprising hydrogen at the top end of the reactor (4b), after which it can be transported with an optional pump compressor (10) towards means (11) for separating pure hydrogen gas (12) from the unconverted gases (13). These recovered gases can be fed into the original stream of hydrocarbon (1) for instance at a junction (26) before the feed enters the reactor (4a). The reactor has an outlet (14b) for discharging a mixture of carbon and molten salts in a side wall, which mixture can be passed through separation means (15) such as a filter, after which separated salt (16) can be conveyed into a salt vessel (17) and fed back into the reactor (4a) and/or (4b) via recycle (18), optionally after increasing the temperature, via an inlet for replenishing the molten salt layer. Carbon can be further treated in a washing vessel (20), to which it is transported via a pump (19), to remove residual traces of salt. The washing vessel is supplied by a stream of aqueous solution (27) after which the suspension comprising water, salt, and carbon is separated using separation means (21) such as a filter. Separated carbon is optionally dried using drying means (22) after which pure solid carbon (23) is obtained. The washed and dissolved salts can be dried using drying means (24) after which the salt can be transported back to a salt vessel (17) using a pump (25). The liquid sulphur discharged via outlet (14a) may be subjected to separation of salt. Conveniently, the mixture is cooled to below the melting point of the salt while being transported to separation means (29) such as a filter, after which liquid sulphur (31) can be collected. The separated salt is preferably recycled to the reactor, for example via pump (30) conveyed into salt vessel (17). Optionally, the reactor contains two salt vessels, one for reactor (4a), which is fed from (29) and replenishes salt layer (7a), and one for reactor (4b), which is fed from (15) and replenishes salt layer (7b).

Conventional molten metal pyrolysis employs a setup as depicted in FIG. 1A. The method of the invention is depicted in FIG. 1B, which uses a reactor wherein liquid salt is present. Natural gas (NG) is fed to the molten metal bubbling column reactor in which the methane pyrolyses into C and $H_2$. The $H_2$ and un-converted $CH_4$ is passed through a pressure swing adsorption (PSA) unit to separate high purity $H_2$. Unconverted $CH_4$ is recycled back to the natural gas input. The bubbling column reactor consists of two liquid layers, separated by density differences. The bottom layer is the molten metal, which catalysis the pyrolysis reaction. Floating on top is the molten salt layer. The produced carbon, due to a significant density difference with the molten metal layer, floats through the molten metal into a molten salt layer (assisted by the produced hydrogen and unconverted hydrocarbon gas bubbles). The molten salt works as a washing solution for the carbon particles. The skimmed off solid carbon/molten salt slurry which is formed in the reactor is further separated with the help of a filter. The filtered carbon can be subsequently washed with water to remove traces of the salt, dried, and collected and sent to carbon storage. The salt stream is recycled back to the molten metal reactor to collect new carbon formed.

Example 2—Separation of Carbon from Molten Metal and Molten Salt

The following procedure was followed:
1. A predefined amount (see table below) of starting mixture comprising metal (gallium), carbon (carbon black with a particle size of at most 100 μm), and salt (a 1:1 by weight mixture of NaNO3 and KNO3) were added to a glass test-tube. Carbon was placed at the bottom and metal at the top.
2. The test tube was heated to 350° C. in an electric oven in two configurations, (a) without bubbling, and (b) with bubbling. The bubbling was induced by an immersed steel tube to replicate conditions during molten metal pyrolysis, where a hydrocarbon stream is bubbled through the molten system.
3. The mixture was maintained in the above defined conditions for 15 minutes up to eight hours. The results shown in table 1 represent samples after 15 minutes.
4. After the duration of predefined time (here 15 minutes) the test tube was taken out of the oven and allowed to cool down. Liquid layers solidified.
5. After cooling down, the carbon (in powered state) was retrieved from the top. The molten metal was taken from the bottom by breaking the test tube. The salt (solid) with carbon embedded in it and was taken from the middle of the test tube.
6. Some salt got stuck to fragments of the broken test tube. This salt was retrieved by washing the fragments in water and collecting the water. This water was added to the mixture of salt and carbon. Any fragments of glass were decanted from the solution, and the carbon was then filtered out and combined with the collected carbon, which was subsequently dried.

7. Water was evaporated to provide the initial salt.

The table below shows the measured mass of carbon, salt and metal (in grams) before and after the separation tests. In the beginning, there are distinct layers of carbon, salt and metal in the test-tube. At high temperature, the layers were reordered by density of the material, and after the test, the separate layers were collected. It was found that almost all of the carbon is separated from the metal, but the collected carbon and salt samples have cross-contamination, which is resolved by washing of the carbon.

| Material | Start mixture | Separated mixture | Recovery (%) * |
|---|---|---|---|
| | Without bubbling | | |
| Salt | 2.91 | 2.86 | 98 |
| Carbon | 0.52 | 0.48 | 92 |
| Molten metal | 8.6 | 8.6 | 100 |
| | With N₂ bubbling | | |
| Salt | 3.45 | 3.21 | 93 |
| Carbon | 0.67 | 0.64 | 96 |
| Molten metal | 17.2 | 17.2 | 100 |

Recovery percentages are determined as follows: Salt is recovered from the salt layer (determined after removal of the carbon), carbon is recovered from the carbon layer and the salt layer (determined after removal of the salt), and metal is recovered from the molten metal layer. Thus, carbon was efficiently separated from the molten metal and recovered from the carbon and salt layers with high yields of over 90%. Residual salt was readily rinsed away and no contamination with molten metal was observed.

Example 3—Separation of Carbon and Ammonia from Molten Metal and Molten Salt To a reactor comprising a molten metal (gallium) and a molten salt (NaCl+KCl in a 50:50 molar ratio) was added $CH_4$, Ar and $N_2$. $CH_4$ was pyrloysed to form solid carbon and $H_2$ gas at a temperature of 1000° C. at a time of T1. $H_2$ and $N_2$ were then reacted together in the presence of Ar at a temperature of 500° C. at a time of T2 to form $NH_3$. The solid carbon and evolved ammonia were collected. Ar did not react during the process. The outlet gas mainly comprised $N_2$, $H_2$, Ar and $NH_3$.

The pH of the solution after pyrolysis was 5.45 and following reaction of $N_2$ and $H_2$ was 6.85. This increase in alkalinity indicated the presence of $NH_3$.

Table 1 shows a high % conversion of $CH_4$ at a temperature of 1000° C. at T1.

TABLE 1

| Volume flow | Methane Volume (ml/min) | N₂ Volume (ml/min) | Ar Volume (ml/min) | H₂ Volume (ml/min) | Total volume (ml/min) |
|---|---|---|---|---|---|
| Inlet gas | 30 | 20 | 50 | | 100 |
| Outlet gas | 1.5 | 20 | 50 | 57 | 128.50 |

| Molar concentration | Methane mol % | N₂ mol % | Ar mol % | H₂ mol % |
|---|---|---|---|---|
| Inlet gas | 30.00 | 20.00 | 50.00 | |
| Outlet gas | 1.17 | 15.56 | 38.91 | 44.36 |

Inlet gas volume 100 ml
Conversion 95%

The data of Table 1 indicates that almost all $CH_4$ was converted to carbon and $H_2$. $N_2$ and Ar did not react. The outlet gas mainly comprised $N_2$, $H_2$ and Ar.

$$CH_4 \rightarrow C + 2H_2$$

Based on above reaction, 1 mole of $CH_4$ provided two moles of $H_2$. The overall volume increased from 100 ml (inlet) to 129 ml (outlet). Thus the relative concentration of gases (Ar, $N_2$) decreased by 77% (100/129). Thus, $N_2$ concentration decreased from 20% to 15.5% and Ar concentration decreased from 50% to 39%.

Table 2 shows the % conversion of $N_2$ and $H_2$ at a temperature of 500° C. at T2.

TABLE 2

| Volume flow | Methane Volume (ml/min) | N₂ Volume (ml/min) | Ar Volume (ml/min) | H₂ Volume (ml/min) | NH₃* Volume (ml/min) | Total volume (ml/min) |
|---|---|---|---|---|---|---|
| Inlet gas | 0 | 33 | 50 | 17 | | 100 |
| Outlet gas | | 32.5 | 50 | 15.42 | 1.58 | 99.5 |

| Molar concentration | Methane mol % | N₂ mol % | Ar mol % | H₂ mol % | NH₃* mol % |
|---|---|---|---|---|---|
| Inlet gas | 0.00 | 33.00 | 50.00 | 17.00 | |
| Outlet gas | 0.00 | 32.65 | 50.26 | 15.50 | 1.59 |

Inlet gas: Total 100.00
Outlet gas: Total 100.00

*$NH_3$ was estimated by the decrease in concentration of $H_2$ in the experiment.

$$\text{Moles of } H_2 \text{ converted} = 1.58 \text{ ml/min}$$
$$= 7.05357^{-5} \text{ mol/min}$$

$$N_2 + 3 H_2 \rightarrow 2 NH_3$$

Based on the above reaction, 3 moles of $H_2$ and 1 mole of $N_2$ provided 2 moles of $NH_3$. Thus, there was an overall decrease in volume and a relative increase of the molar % of unreacted components. After taking $NH_3$ production into account this decrease was not considered to be significant.

$NH_3$ production is estimated via:

(a) measuring the decrease in $H_2$ concentration in the outlet gas—provided estimated production of 1 ml/min $NH_3$.

(b) measuring the pH increase in the water wash at the exit of the column—provided estimated absorption of 2.1 ml of $NH_3$ gas in liquid water.

The invention claimed is:

1. Method for producing of solid carbon and one or more of liquid sulphur, hydrogen gas and ammonia gas by molten metal pyrolysis of hydrocarbons, the method comprising:

(i) feeding a stream comprising hydrocarbon and nitrogen and/or hydrogen sulphide into a pyrolysis reactor comprising a catalytic layer of molten metal, wherein the reactor comprises two reaction zones, a first zone for pyrolysing the hydrocarbon into solid carbon and hydrogen gas, and a second zone at a lower temperature than the first zone, for reacting the hydrogen with the nitrogen to form ammonia, and/or for pyrolysing hydrogen sulphide into sulphur and hydrogen gas;

(ii) feeding a stream of molten salt into the pyrolysis reactor to separate the solid carbon from the molten metal;

(iii) collecting a product gas containing ammonia gas and/or hydrogen gas that evolves from the reactor;

(iv) collecting a mixture comprising solid carbon and molten salt;

(v) optionally collecting liquid sulphur;

(vi) separating the mixture obtained in step (iv) to obtain a product comprising solid carbon and separated salt.

2. The method according to claim 1, which is for producing solid carbon and ammonia gas by molten metal pyrolysis of hydrocarbons, the method comprising:

(i) feeding a stream comprising hydrocarbon and nitrogen into a pyrolysis reactor comprising a catalytic layer of molten metal, wherein the reactor comprises two reaction zones, a first zone for pyrolysing the hydrocarbon into solid carbon and hydrogen gas, and a second zone for reacting the hydrogen with the nitrogen to form ammonia, and wherein the second zone is kept at a lower temperature than the first zone;

(ii) feeding a stream of molten salt into the pyrolysis reactor to separate the solid carbon from the molten metal;

(iii) collecting a product gas containing ammonia gas that evolves from the reactor;

(iv) collecting a mixture comprising solid carbon and molten salt;

(vi) separating the mixture obtained in step (iv) to obtain a product comprising solid carbon and separated salt.

3. The method according to claim 1, which is for producing solid carbon, liquid sulphur and hydrogen gas by molten metal pyrolysis of hydrocarbons, the method comprising:

(i) feeding a stream comprising hydrocarbon and hydrogen sulphide into a pyrolysis reactor comprising a catalytic layer of molten metal, wherein the reactor comprises two reaction zones, a first zone for pyrolysing the hydrocarbon into solid carbon and hydrogen gas, and a second zone for pyrolysing hydrogen sulphide into liquid sulphur and hydrogen gas, and wherein the second zone is kept at a lower temperature than the first zone;

(ii) feeding a stream of molten salt into the pyrolysis reactor to separate the solid carbon and the liquid sulphur from the molten metal;

(iii) collecting a product gas containing hydrogen gas that evolves from the reactor;

(iv) collecting a mixture comprising solid carbon and molten salt;

(v) collecting liquid sulphur;

(vi) separating the mixture obtained in step (iv) to obtain a product comprising solid carbon and separated salt.

4. The method according to claim 1, wherein the metal in the molten metal is selected from the group consisting of Mg, Pd, In, Bi, Sn, Ga, Pb, Ag, Cu, Sn, Pt, Ni, Fe, Co, Au, Mo, Cr, W and V.

5. The method according to claim 1, wherein the salt has a heat capacity of at most 2 J/K and/or wherein the salt comprises at least one of $KNO_3$, $NaNO_3$, NaCl, KCl, LiCl, $MgCl_2$, CuCl, $NiCl_2$, $ZnCl_2$, $ZnBr_2$ and NaBr.

6. The method according to claim 1, wherein the hydrocarbon comprises a $C_1$-$C_4$ hydrocarbon.

7. The method according to claim 1, further comprising:

(vii) separating the product gas obtained in step (iii) into unconverted hydrocarbon gas, unconverted nitrogen gas, hydrogen gas and ammonia gas, to obtain purified hydrogen gas, purified ammonia gas, recovered hydrocarbon and recovered nitrogen gas.

8. The method according to claim 1, wherein the metal for the catalytic layer of molten metal in the first zone differs from the metal used for the catalytic layer in the second zone.

9. The method according to claim 1, wherein step (i) typically involves bubbling of the hydrocarbon feed though the molten metal, wherein the diameter of the bubbles is in the range of 0.1-1000 μm.

10. The method according to claim 1, wherein the metal in the first zone is selected from Mg, Pd, In, Bi, Sn, Ga, Pb, Ag, Cu, Sn, Pt, Ni, Fe, Co and Au and/or wherein the metal in the second zone is selected from In, Co, Fe, Ni, Mo, Cu, Cr, W and V.

11. The method according to claim 1, wherein the hydrocarbon comprises methane.

12. The method according to claim 1, wherein the metal of the catalytic layer in the first zone is Ni and/or the metal of the second zone is Fe or Co.

13. The method according to claim 1, wherein step (i) typically involves bubbling of the hydrocarbon feed through the molten metal, wherein the diameter of the bubbles is in a range of from 10-100 μm.

14. Reactor for performing molten metal pyrolysis of hydrocarbons, the reactor comprising:

(a) a vessel for holding a catalytic layer of molten metal and a layer of molten salt, (b) an inlet for receiving the feedstock comprising hydrocarbon and nitrogen and/or hydrogen sulphide at or near the bottom end of the vessel, a first outlet for discharging a mixture of solid carbon and molten salts in a side wall of the vessel, and a second outlet for discharging a product gas at the top end of the vessel;

(c) catalytic layer of molten metal comprising two reaction zones with different temperatures;

(d) a filter for separating a mixture of solid carbon and molten salts discharged from the first outlet;

(e) means for heating the reactor to a first temperature in a first zone and to a second temperature in a second zone, wherein the first temperature is higher than the second temperature;

(f) a recycle for recycling molten salts from the separator to the vessel.

15. The reactor according to claim 14, which is for performing molten metal pyrolysis of hydrocarbons, wherein the reactor comprises:

(a) a vessel for holding a catalytic layer of molten metal and a layer of molten salt, (b) an inlet for receiving the hydrocarbon and nitrogen at or near the bottom end of the vessel, a first outlet for discharging a mixture of solid carbon and molten salts in a side wall of the vessel, and a second outlet for discharging a product gas comprising ammonia at the top end of the vessel;

(c) catalytic layer of molten metal comprising two reaction zones with different temperatures;

(d) a filter for separating a mixture of solid carbon and molten salts discharged from the first outlet;

(e) means for heating the reactor to a first temperature in a first zone and to a second temperature in a second zone, wherein the first temperature is higher than the second temperature and the first zone is located upstream of the second zone;

(f) a recycle for recycling molten salts from the separator to the vessel.

16. The reactor according to claim 14, which is for performing molten metal pyrolysis of hydrocarbons, wherein the reactor comprises:

(a) a vessel for holding a catalytic layer of molten metal and a layer of molten salt, (b) an inlet for receiving the hydrocarbon and hydrogen sulphide at or near the bottom end of the vessel, a first outlet for discharging a mixture of solid carbon and molten salts in a side wall of the vessel, and a second outlet for discharging a product gas comprising hydrogen at the top end of the vessel, and a separate outlet for discharging a mixture of liquid sulphur and molten metal in a side wall which is positioned below the outlet for discharging a mixture of carbon and molten salts;

(c) a catalytic layer of molten metal comprising two reaction zones with different temperatures;

(d) a filter for separating a mixture of solid carbon and molten salts discharged from the first outlet; and (e) means for heating the reactor to a first temperature in a first zone and to a second temperature in a second zone, where the first temperature is higher than the second temperature;

(f) a recycle for recycling molten salts from the separator to the vessel.

17. The reactor according to claim 14, wherein the reactor is a bubble column reactor.

18. The reactor according to claim 14, wherein the reactor is heated using the hydrocarbon, the hydrogen gas, or electricity.

\* \* \* \* \*